US 12,404,962 B2

(12) United States Patent
Zhang

(10) Patent No.: US 12,404,962 B2
(45) Date of Patent: Sep. 2, 2025

(54) CONNECTOR ASSEMBLY

(71) Applicant: A. Raymond et Cie, Grenoble (FR)

(72) Inventor: Chao Zhang, Jiangsu (CN)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 18/294,538

(22) PCT Filed: Aug. 1, 2022

(86) PCT No.: PCT/CN2022/109411
§ 371 (c)(1),
(2) Date: Feb. 1, 2024

(87) PCT Pub. No.: WO2023/011406
PCT Pub. Date: Feb. 9, 2023

(65) Prior Publication Data
US 2024/0328552 A1    Oct. 3, 2024

(30) Foreign Application Priority Data

Aug. 2, 2021 (CN) ......................... 202110881106.7
Aug. 2, 2021 (CN) ......................... 202121780013.7

(51) Int. Cl.
*F16L 37/34* (2006.01)
(52) U.S. Cl.
CPC .................................. *F16L 37/34* (2013.01)
(58) Field of Classification Search
CPC ... F16L 37/34; F16L 37/35; Y10T 137/87957; Y10T 137/87973
See application file for complete search history.

(56) References Cited

U.S. PATENT DOCUMENTS 7,147,003 B2 * 12/2006 Maldavs ................. F16L 37/35
                                                    137/614.04
8,707,993 B2 *  4/2014 Cardi ..................... F16L 37/56
                                                    137/614.04
(Continued)

FOREIGN PATENT DOCUMENTS

| CN | 106917926 A | 7/2017 |
| EP | 1164327 A1 | 12/2001 |
| JP | H09280452 A | 10/1997 |

OTHER PUBLICATIONS

International Search Report for PCT/CN2022/109411 dated Oct. 6, 2022, 2 pages.
(Continued)

*Primary Examiner* — Michael R Reid
(74) *Attorney, Agent, or Firm* — WARNER NORCROSS + JUDD LLP

(57) ABSTRACT

A connector assembly is provided. The connector assembly includes a male connector for connecting with a female connector. The female connector includes: a housing; a first tubular body received within and fixed to the housing; and a locking sleeve rotatably sleeved outside the first tubular body and including a guiding groove and a locking groove. The guiding groove and the locking groove are arranged on a circumferential wall of the locking sleeve and are connected to each other. The male connector includes: a casing; and a second tubular body received within and fixed to the casing and including a locking protrusion arranged on an outer periphery thereof. The connector assembly is configured to realize the connecting and locking of the female connector and the male connector in a small operation space.

16 Claims, 22 Drawing Sheets

(56) References Cited

U.S. PATENT DOCUMENTS

| | | | |
|---|---|---|---|
| 10,190,713 B2* | 1/2019 | Tiberghien | F16L 37/32 |
| 10,781,957 B2 | 9/2020 | Tiberghien et al. | |
| 2007/0025811 A1 | 2/2007 | Wilhelm | |
| 2015/0001844 A1 | 1/2015 | Tiberghien et al. | |
| 2015/0276110 A1 | 10/2015 | Parekh et al. | |
| 2017/0191595 A1 | 7/2017 | Van Scyoc | |
| 2018/0209573 A1* | 7/2018 | Tiberghien | F16L 37/30 |

OTHER PUBLICATIONS

Machine assisted English translation of EP1164327A1 obtained from https://worldwide.espacenet.com/patent on Jan. 28, 2024, 10 pages.

Machine assisted English translation of CN106917926A obtained from <https://patents.google.com/patent> on Oct. 15, 2024, 7 pages.

Office Action issued by the China National Intellectual Property Administration in Chinese Patent Application No. 202110881106.7, (18 pages).

Office Action issued by the China National Intellectual Property Administration in Chinese Patent Application No. 202110881106.7, dated Jul. 31, 2025 (16 pages).

* cited by examiner

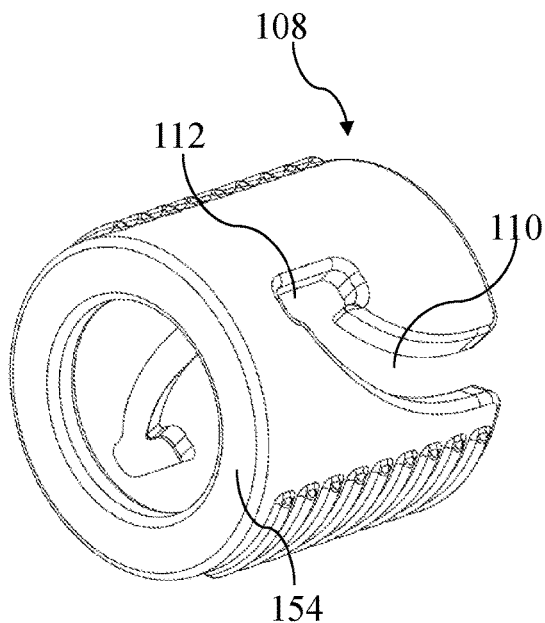
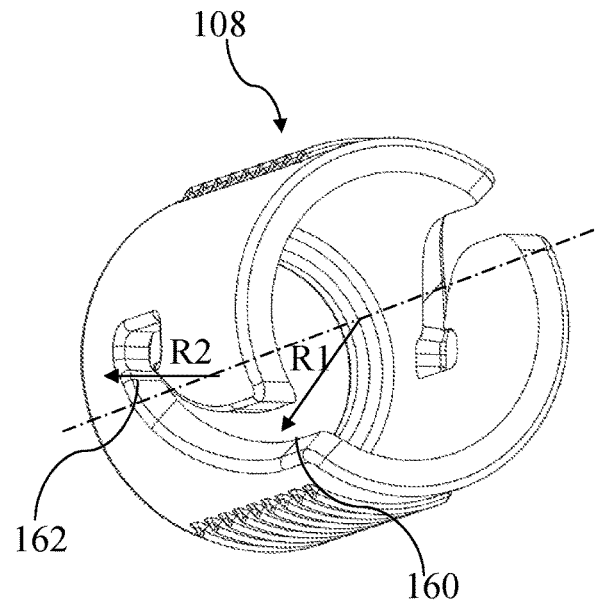
FIG. 6A          FIG. 6B
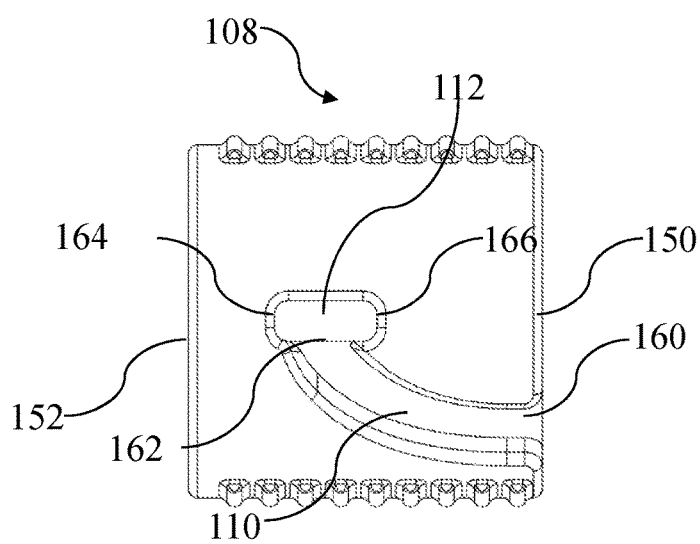
FIG. 6C

CONNECTOR ASSEMBLY

CROSS-REFERENCE TO RELATED APPLICATIONS

This application is the National Stage of International Appl. No. PCT/CN2022/109411 filed on 1 Aug. 2022, which claims priority to and all advantages of Chinese Patent Appl. No. 202110881106.7 filed on 2 Aug. 2021 and Chinese Patent Appl. No. 202121780013.7 filed on 2 Aug. 2021, the contents of which are hereby incorporated by reference.

RELATED FIELD

The present application generally relates to a connector assembly for establishing fluid communication.

BACKGROUND

A connector assembly can be used to establish fluid communication between fluid pipelines in many different application scenarios.

The connector assembly generally includes a female connector and a male connector each of which is directly or indirectly connected to a fluid pipeline. The male connector can be inserted into the female connector to establish fluid communication between the fluid pipelines. In some application scenarios, the connector assembly is required to have a bidirectional cut-off function to prevent the fluid in the fluid pipelines from flowing out through the female connector and the male connector when the female connector and the male connector are disconnected. In some other application scenarios, such as in the case that the connector assembly is applied to a battery pack of a new energy vehicle, it is desirable to quickly and conveniently connect the female connector with the male connector in a small installation space. In addition, the connector assembly with the bidirectional cut-off function is needed in many application scenarios, so it is desirable to improve the compatibility of the connector assembly for various application scenarios. At present, developing a connector assembly that can achieve the above functions still faces many challenges.

SUMMARY

An object of the present application is to provide an improved connector assembly to achieve one or more of the above functions.

The present application provides a connector assembly which includes a female connector and a male connector for being connected with the female connector. The female connector includes: a housing; a first tubular body defining a first axial direction, the first tubular body being at least partially received within and being fixed to the housing; a valve unit at least partially arranged in the first tubular body; and a locking sleeve sleeved outside the first tubular body in a rotatable manner. At least part of the locking sleeve is confined between the housing and the first tubular body in the first axial direction, and the locking sleeve includes a guiding groove and a locking groove which are connected to each other and arranged on a circumferential wall of the locking sleeve. The male connector includes: a casing; a second tubular body defining a second axial direction, the second tubular body being at least partially received within and being fixed to the casing, the second tubular body being configured to be insertable between the locking sleeve and the first tubular body in the first axial direction, the second tubular body including a locking protrusion arranged on an outer periphery of the second tubular body; and a valve assembly at least partially arranged in the second tubular body. During an insertion of the second tubular body between the locking sleeve and the first tubular body, the locking protrusion is adapted to move along the guiding groove and drive the locking sleeve to rotate until the locking protrusion enters the locking groove. The locking protrusion is adapted to engage with the locking groove due to interaction of the valve assembly and the valve unit after the locking protrusion enters the locking groove, to prevent the second tubular body from disengaging from the locking sleeve.

Arranging the locking sleeve in a rotatable manner allows the female connector to be connected and locked with the male connector by means of straight insertion/push operation of the female connector and/or male connector during the connection of the female connector and the male connector. This straight insertion/push operation requires a smaller operation space and is convenient to conduct. And during the straight insertion/push operation, there is no need to rotate the housing of the female connector. This avoids the rotational resistance due to the fluid pipeline connected to the housing of the female connector when the housing of the female connector is rotated, and also reduces stress at the connection between the housing of the female connector and the fluid pipeline connected thereto.

According to the above technical concept, the present application may further include one or more of the following optional forms.

In some optional forms, the housing has a first limiting portion. The first tubular body has a second limiting portion arranged on the outer periphery of the first tubular body. The locking sleeve has a shoulder extending radially inward. And the shoulder is confined between the first limiting portion and the second limiting portion.

In some optional forms, the locking sleeve has a first end and a second end. And the guiding groove extends from the first end towards the second end, and the guiding groove has an inlet end at the first end and an outlet end away from the first end.

In some optional forms, the guiding groove is arc-shaped.

In some optional forms, an angle between a first radial direction of the locking sleeve pointed towards the inlet end and a second radial direction of the locking sleeve pointed towards the outlet end is less than 90°.

In some optional forms, the angle ranges from 30° to 60°.

In some optional forms, the angle is 45°.

In some optional forms, the locking groove extends in the first axial direction, and at least part of the locking groove extends from the outlet end of the guiding groove towards the first end of the locking sleeve.

In some optional forms, the locking groove has a positioning end and a locking end opposite to each other. The positioning end and the locking end are respectively located on two sides of the outlet end of the guiding groove. The locking end is closer to the first end of the locking sleeve than the positioning end. The locking protrusion is adapted to move along the guiding groove and enter the positioning end during the insertion of the second tubular body between the locking sleeve and the first tubular body. And the locking protrusion is further adapted to move from the positioning end to the locking end and engage with the locking end due to the interaction of the valve assembly and the valve unit after the locking protrusion enters the positioning end.

In some optional forms, the housing includes a first receiving section and a second receiving section which are configured to be capable of being mated with the first tubular body and the second tubular body, respectively; and the casing includes a third receiving section and a fourth receiving section which are configured to be capable of being mated with the first tubular body and the second tubular body, respectively. In this way, the connector assembly with various configurations can be provided and the application range of the connector assembly can be expanded, while the manufacturing cost of the connector assembly, especially the cost of preparing the mold can be significantly reduced.

In some optional forms, the housing includes a first connection section in the form of a hose connection section or a threaded connection section; and/or the casing includes a second connection section in the form of a hose connection section or a threaded connection section.

In some optional forms, the housing and the first tubular body are fixed to each other by interference fit, snap fit and/or welding; and/or the casing and the second tubular body are fixed to each other by interference fit, snap fit and/or welding.

In some optional forms, the first tubular body has a plug end defining a port. The valve unit includes a valve core and an elastic member. The valve core is movable in the first axial direction between a first closed position and a first open position. The valve core is biased toward the first closed position by the elastic member. The valve core blocks the port to cut off a flow path of the female connector when the valve core is in the first closed position, and the flow path of the female connector is opened when the valve core is in the first open position.

In some optional forms, the plug end defines a first inner peripheral inclined surface and a second inner peripheral inclined surface. An inner peripheral surface of the port, the first inner peripheral inclined surface, and the second inner peripheral inclined surface are sequentially connected in the first axial direction. The first inner peripheral inclined surface and the second inner peripheral inclined surface are configured to guide a sealing member embedded in an outer periphery of the valve core to move in the first axial direction to come into sealing contact with the inner peripheral surface of the port. The first inner peripheral inclined surface and the second inner peripheral inclined surface respectively form a first angle and a second angle with respect to the first axial direction, and the first angle is smaller than the second angle.

In some optional forms, the first angle ranges from 5° to 15°.

In some optional forms, the valve assembly includes a valve stem, a sliding sleeve and an elastic element. The valve stem includes a valve stem head portion and a valve stem base portion at two ends of the valve stem, respectively. The sliding sleeve is arranged in the second tubular body and sleeved outside the valve stem, and the sliding sleeve is slidable between a second closed position and a second open position along the second axial direction. And two ends of the elastic element respectively abut against the sliding sleeve and the valve stem base portion to bias the sliding sleeve toward the second closed position. The sliding sleeve blocks an annular gap between the second tubular body and the valve stem head portion to cut off a flow path of the male connector when the sliding sleeve is in the second closed position, and the flow path of the male connector is opened when the sliding sleeve is in the second open position.

In some optional forms, the valve stem base portion includes: a base body provided with a through hole penetrating through the base body for fluid to flow therethrough; and a projection extending from a center of the base body and away from the valve stem head portion. The projection tapers in a direction away from the valve stem head portion.

In some optional forms, the projection is in the shape of a semi-ellipsoid.

In some optional forms, the second tubular body includes a second tubular main body. The locking protrusion is made of metal, and the second tubular main body is made of plastic. And the second tubular main body and the locking protrusion are integrally formed by insert injection molding.

The connector assembly according to the present application can conveniently realize the connecting and locking of the female connector and the male connector in a small operation space, and the configuration of the connector assembly can be varied at a low cost to adapt to various application scenarios.

BRIEF DESCRIPTION OF THE DRAWINGS

Other features and advantages of the present application will be readily understood through the following preferred embodiments described in detail with reference to the accompanying drawings, in which the same reference numerals indicate the same or similar components.

FIG. 6A and FIG. 6B respectively are perspective views of a locking sleeve of the female connector of the connector assembly according to the first embodiment of the present application, viewed from different perspectives;

FIG. 6C is a front view of the locking sleeve of the female connector of the connector assembly according to the first embodiment of the present application;

DETAILED DESCRIPTION

Figure 1:
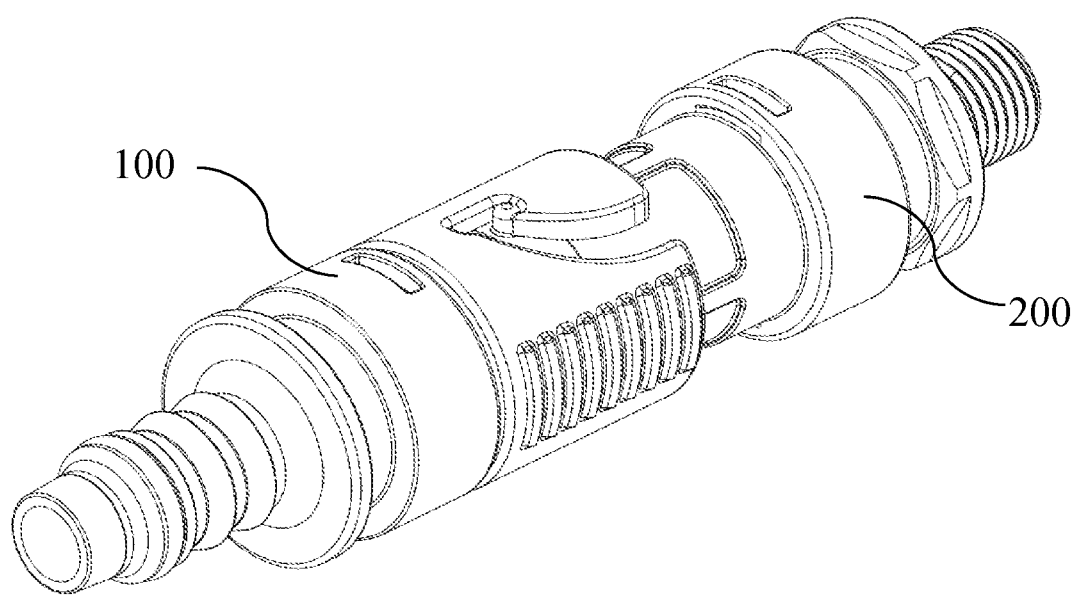
FIG. 1 is a perspective view of a connector assembly according to a first embodiment of the present application.
Figure 2A:
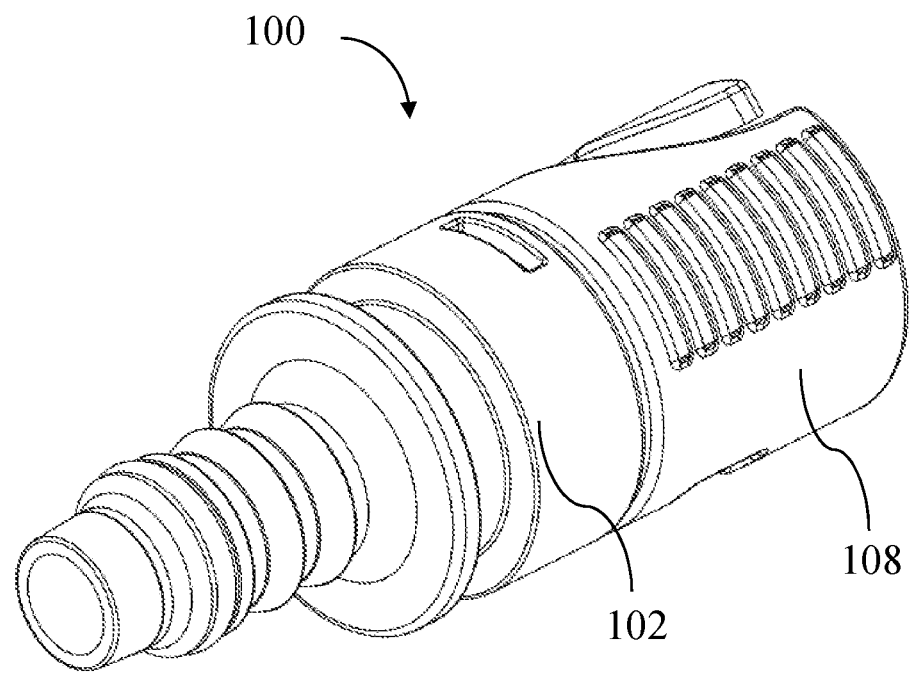
FIG. 2A and FIG. 2B respectively are a perspective view and a front view of a female connector of the connector assembly according to the first embodiment of the present application.
Figure 2B:
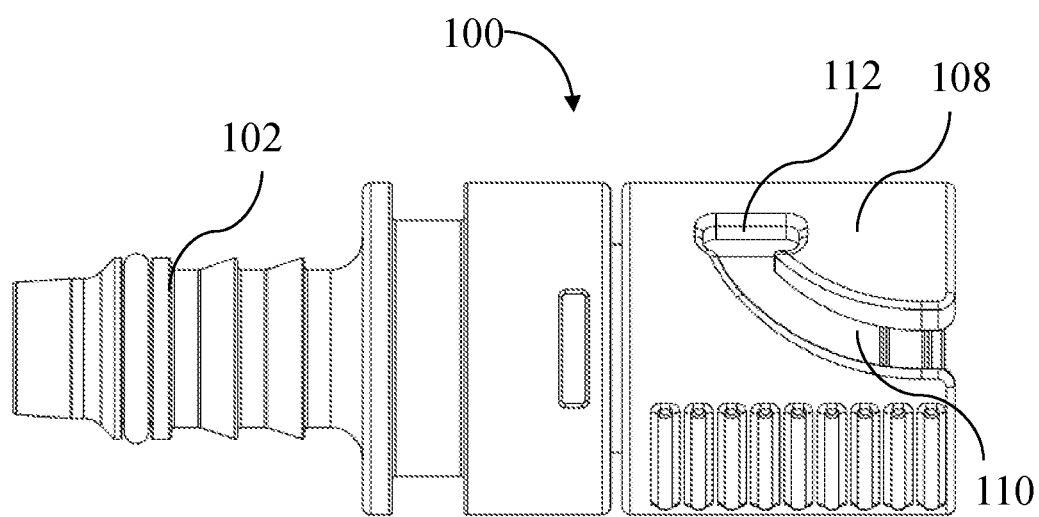

The implementation and usage of the embodiments are discussed in detail below. However, it is conceivable that the specific embodiments discussed are merely intended to illustrate specific ways of implementing and using the present application, and are not intended to limit the scope of the present application. When describing structures and positions of components, the direction-related expressions herein, such as "upper", "lower", "top", and "bottom", are not absolute, but relative. When the components are arranged as shown in the drawings, these direction-related expressions are appropriate, but when the positions of these components in the drawings are altered, these direction-related expressions should be altered accordingly.

In the present application, an axial direction of a tubular or annular component refers to a direction along the central axis of the component, a circumferential direction of the tubular or annular component refers to a direction along the circumference of the component, and a radial direction of the tubular or annular component refers to a direction passing through the central axis of the component and perpendicular to the axial direction of the component.

FIG. 1 to FIG. 18C illustrate a connector assembly 10 according to a first embodiment of the present application.

Referring to FIGS. 1 to 3B and FIGS. 8A to 9, the connector assembly 10 includes a female connector 100 and a male connector 200 for being connected with the female connector 100. The female connector 100 includes a housing 102, a first tubular body 104, a valve unit 106 and a locking sleeve 108. The first tubular body 104 defines a first axial direction A1. The first tubular body 104 is at least partially received within the housing 102 and is fixed to the housing 102. The valve unit 106 is at least partially arranged in the first tubular body 104. The locking sleeve 108 is sleeved outside the first tubular body 104 in a rotatable manner. At least part of the locking sleeve 108 is confined between the housing 102 and the first tubular body 104 in the first axial direction A1. The locking sleeve 108 includes a guiding groove 110 and a locking groove 112 which are connected to each other and arranged on a circumferential wall of the locking sleeve 108. The male connector 200 includes a casing 202, a second tubular body 204 and a valve assembly 206. The second tubular body 204 defines a second axial direction A2. The second tubular body 204 is at least partially received within the casing 202 and is fixed to the casing 202. The second tubular body 204 is configured to be insertable between the locking sleeve 108 and the first tubular body 104 in the first axial direction A1. The second tubular body 204 includes a locking protrusion 208 arranged on an outer periphery of the second tubular body 204. The valve assembly 206 is at least partially arranged in the second tubular body 204. While the second tubular body 204 is inserted between the locking sleeve 108 and the first tubular body 104, the locking protrusion 208 is adapted to move along the guiding groove 110 and drive the locking sleeve 108 to rotate until the locking protrusion 208 enters the locking groove 112. The locking protrusion 208 is adapted to engage with the locking groove 112 due to the interaction of the valve assembly 206 and the valve unit 106 after the locking protrusion 208 enters the locking groove 112, to prevent the second tubular body 204 from disengaging from the locking sleeve 108.

FIGS. 2A to 7B illustrate the female connector 100 of the connector assembly 10 according to the first embodiment of the present application and its various components. The housing 102, the first tubular body 104 and the locking sleeve 108 of the female connector 100 may all be formed by injection molding.

Referring to FIG. 3A and FIGS. 4A to 4C, the housing 102 of the female connector 100 may be substantially tubular, and include a first connection section 114, a first receiving section 116 and a second receiving section 118 connected to each other in the first axial direction A1. The first connection section 114 may be directly connected to a fluid pipeline for fluid communication with the fluid pipeline. In the illustrated embodiment, the first connection section 114 may be in the form of a hose connection section to be directly connected with a hose (not shown). The first connection section 114 includes multiple circumferential annular flanges 120 on the outer periphery of the first connection section 114, and the hose can be sleeved outside the first connection section 114 and remain connected to the housing 102 through the multiple annular flanges 120.

Figure 5A:
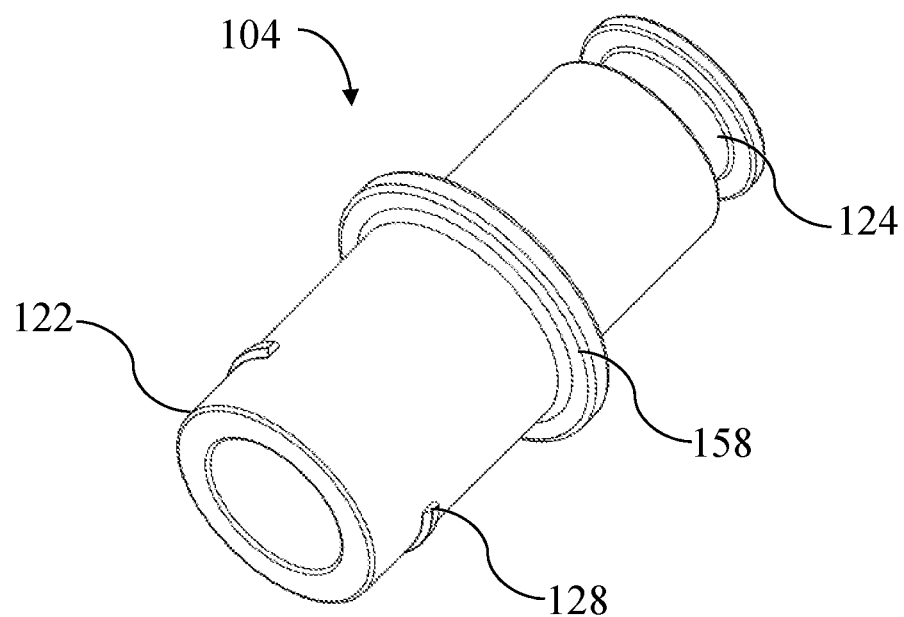
FIG. 5A and FIG. 5B respectively are a perspective view and a front view of a first tubular body of the female connector of the connector assembly according to the first embodiment of the present application.
Figure 5B:
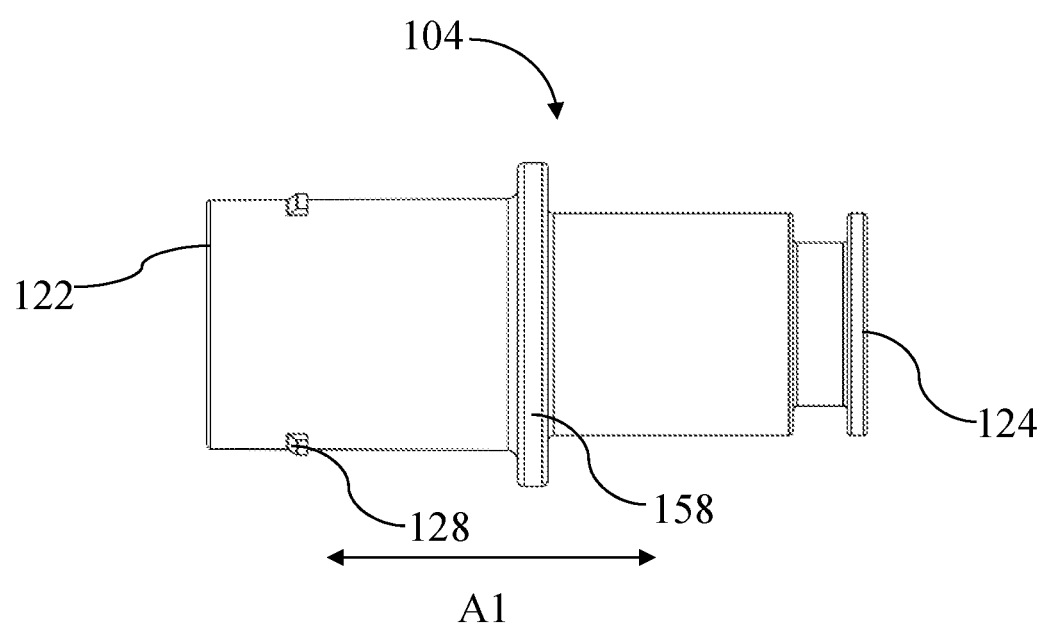
Figure 7A:
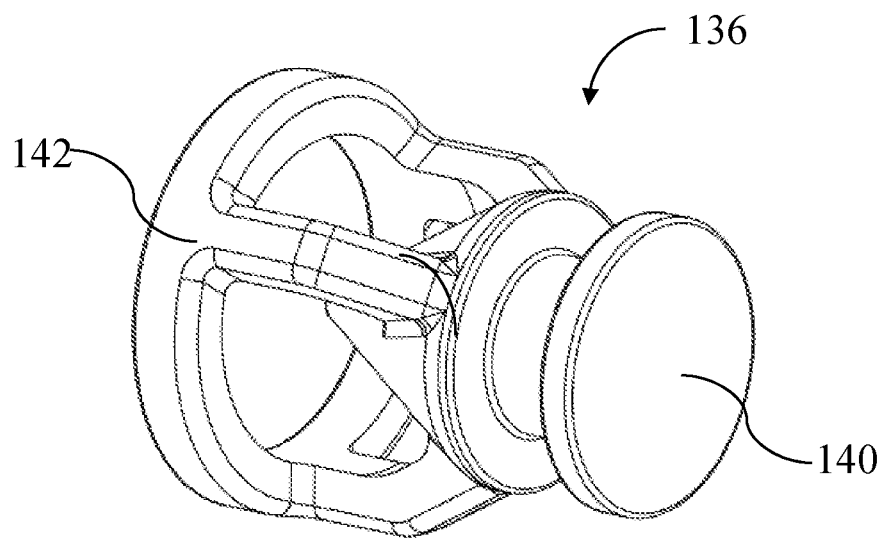
FIG. 7A and FIG. 7B respectively are a perspective view and a front view of a valve core of the female connector of the connector assembly according to the first embodiment of the present application.
Figure 7B:
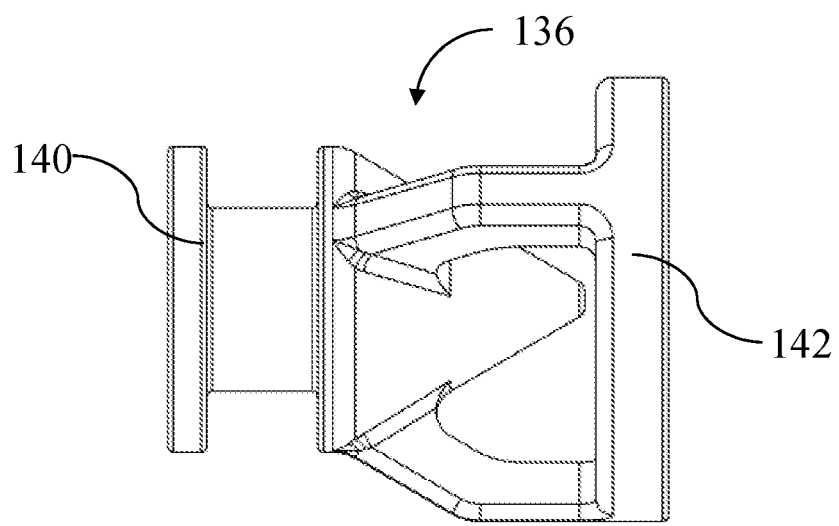
Figure 8A:
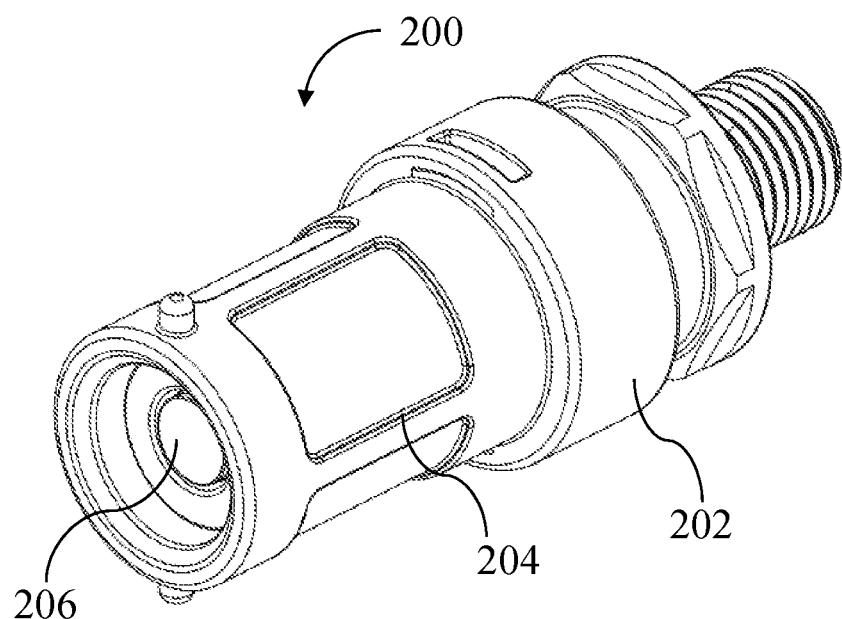
FIG. 8A and FIG. 8B respectively are a perspective view and a front view of a male connector of the connector assembly according to the first embodiment of the present application.
Figure 8B:
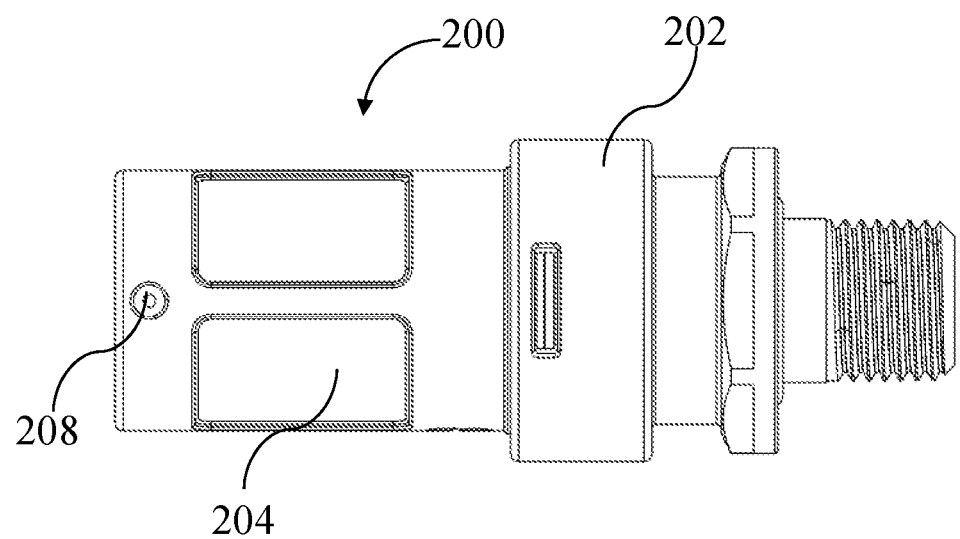

Referring to FIG. 5A and FIG. 5B, the first tubular body 104 of the female connector 100 is substantially tubular, and includes a fixing end 122 and a plug end 124 in the first axial direction A1. The plug end 124 of the first tubular body 104 defines a port 126 (as shown in FIG. 18C).

Figure 3A:
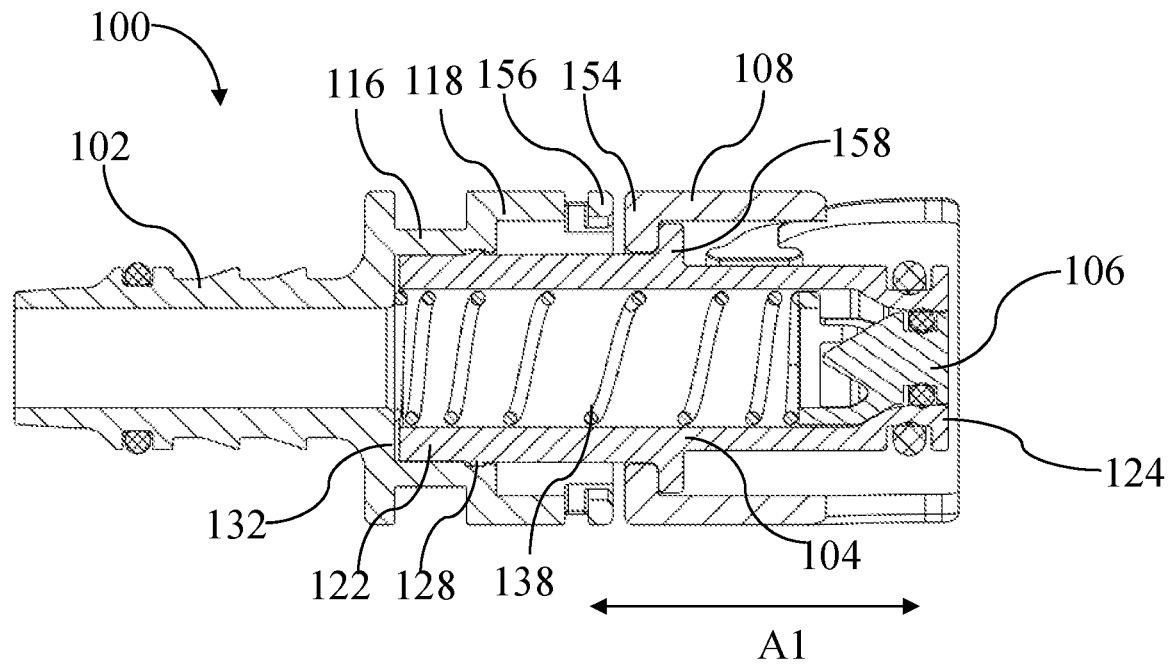
FIG. 3A is a cross-sectional view of the female connector of the connector assembly according to the first embodiment of the present application.
Figure 3B:
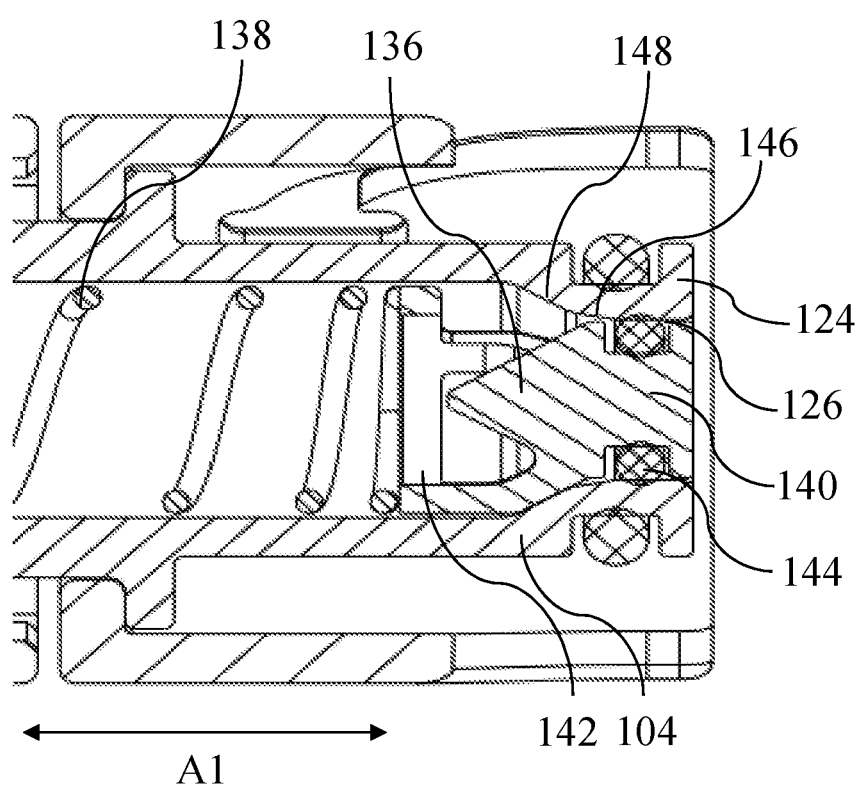
FIG. 3B is a partly enlarged view of FIG. 3A.
Figure 4A:
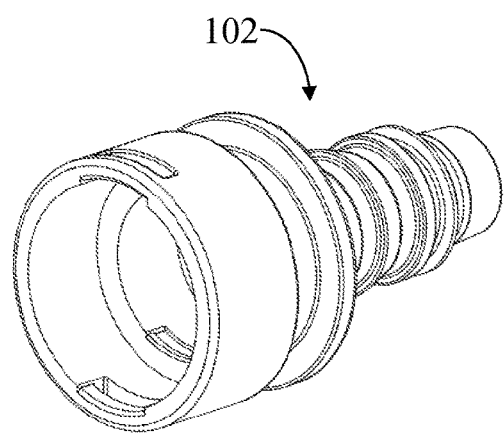
FIG. 4A to FIG. 4C respectively are a perspective view, a front view, and a cross-sectional view of a housing of the female connector of the connector assembly according to the first embodiment of the present application.
Figure 4B:
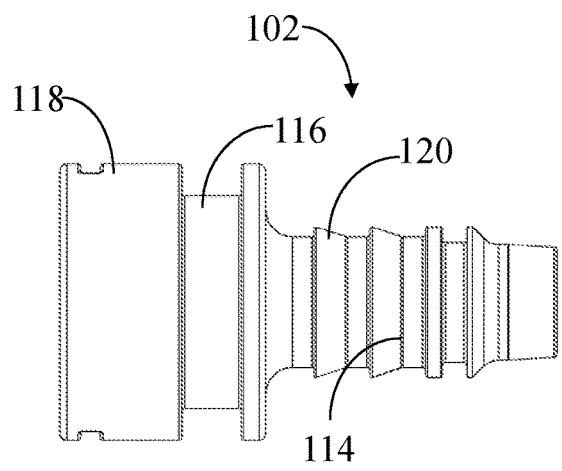
Figure 4C:
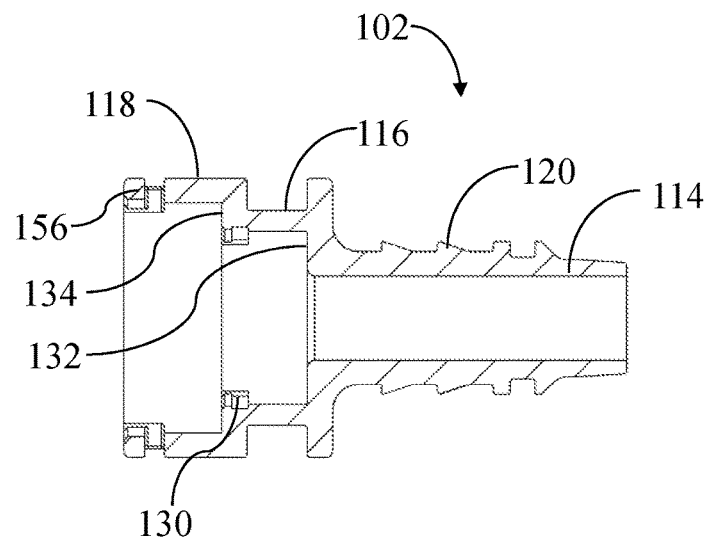

Referring to FIG. 3A and FIG. 4C, in the illustrated embodiment, the first tubular body 104 of the female connector 100 is at least partially received within the first receiving section 116 of the housing 102 and is fixed to the first receiving section 116 of the housing 102.

The first receiving section 116 of the housing 102 is configured to be capable of being mated with the fixing end 122 of the first tubular body 104. Optionally, the first receiving section 116 may be in interference fit with the fixing end 122 of the first tubular body 104, such that the fixing end 122 of the first tubular body 104 is fixed to the first receiving section 116.

Optionally, the first receiving section 116 and the fixing end 122 of the first tubular body 104 may be further fixed to each other by welding in the circumferential direction to provide higher fixing strength and achieve the sealing between the first receiving section 116 and the first tubular body 104, thereby reducing the use of sealing members and saving costs.

Optionally, as shown in FIG. 3A and FIG. 4C, the outer peripheral surface of the fixing end 122 of the first tubular body 104 may be provided with a first positioning protrusion 128, the inner peripheral surface of the first receiving section 116 may correspondingly be provided with a first positioning recess 130, and the first positioning protrusion 128 and the first positioning recess 130 may be engaged with each other by snap fit, so as to improve the fixing strength of the first tubular body 104 and the first receiving section 116.

It is conceivable that the housing 102 and the first tubular body 104 may be fixed to each other by interference fit, snap fit, welding or any combination thereof.

Figure 14A:
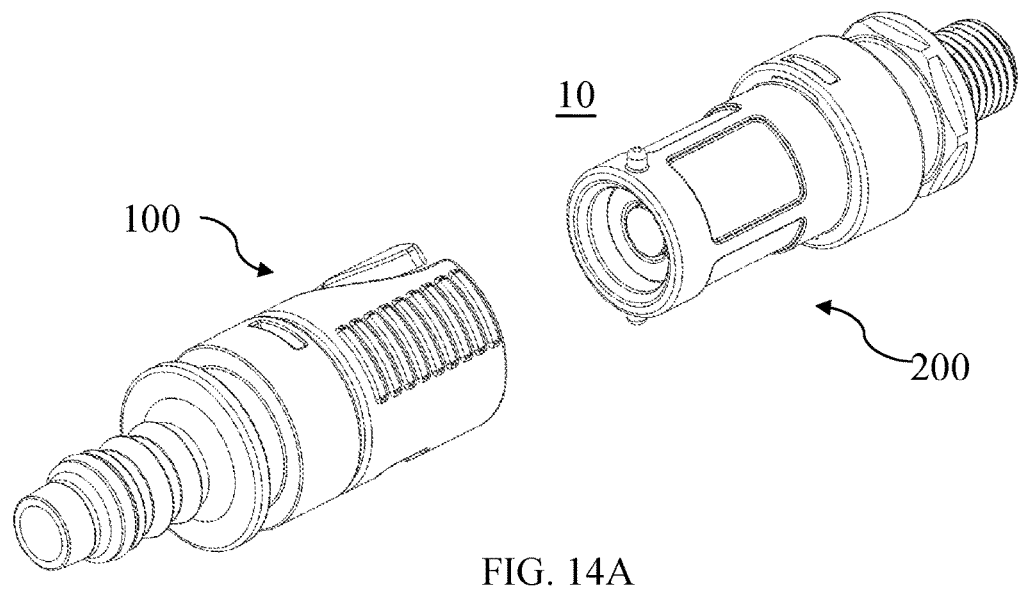
FIG. 14A to FIG. 14C respectively are a perspective view, a front view, and a cross-sectional view of the female connector and the male connector of the connector assembly according to the first embodiment of the present application, when the female connector and the male connector are disconnected from each other.
Figure 14B:
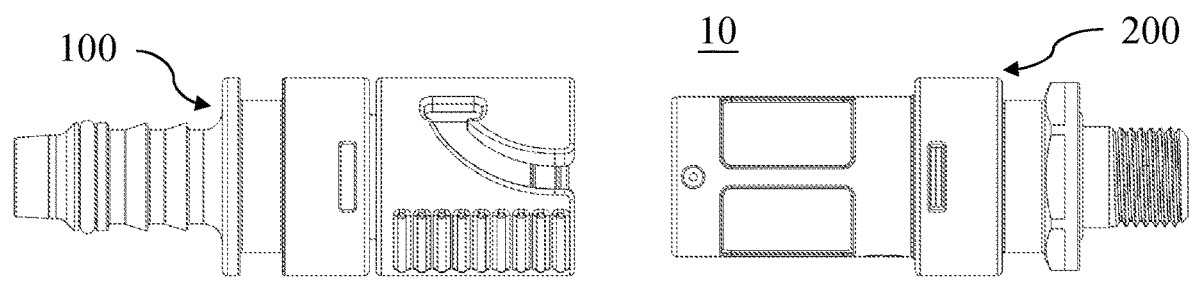
Figure 14C:
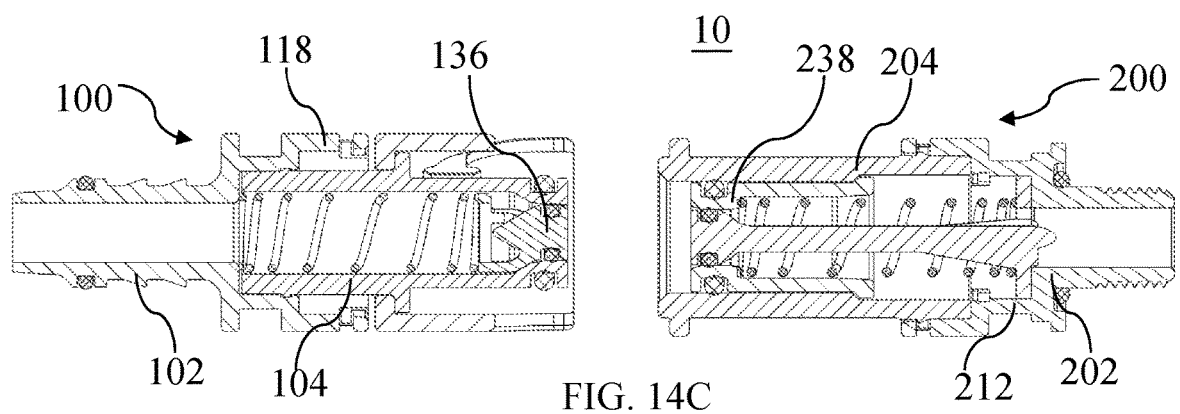

In addition, referring to FIG. 3A, FIG. 4C and FIG. 14C, the second receiving section 118 of the housing 102 is configured to be capable of being mated with the second tubular body 204 of the male connector 200. In other words, according to the actual application requirements, for example, in the case that the casing of the male connector 200 needs to have a hose connection section, the housing 102 of the female connector 100 can also be used as the casing of the male connector 200 and be assembled and fixed with the second tubular body 204 of the male connector 200, so that there is no need to manufacture a new mold for a casing having a hose connection section for the male connector 200.

Thus, the first receiving section 116 and the second receiving section 118 of the housing 102 can respectively be mated with the first tubular body 104 of the female connector 100 and the second tubular body 204 of the male connector 200, which can reduce the number of injection molds required for manufacturing the connector assembly 10 and significantly reduce manufacturing costs, as will be explained further below.

The first receiving section 116 has a larger diameter than the first connection section 114 and the second receiving section 118 has a larger diameter than the first receiving section 116, so that a first inner stepped portion 132 is formed between the first connection section 114 and the first receiving section 116, and a second inner stepped portion 134 is formed between the first receiving section 116 and the second receiving section 118. The first inner stepped portion 132 is configured to limit the first tubular body 104 when the first receiving section 116 is mated with the first tubular body 104.

Referring to FIGS. 3A, 3B, 7A and 7B, in the illustrated embodiment, the valve unit 106 may be arranged within the first tubular body 104. The valve unit 106 may include a valve core 136 and an elastic member 138. The valve core 136 is movable in the first axial direction A1 between a first closed position (shown in FIG. 3B) and a first open position (shown in FIG. 18C). The valve core 136 is biased toward the first closed position by the elastic member 138. The valve core 136 blocks the port 126 to cut off a flow path of the female connector 100 when the valve core 136 is in the first closed position, and the flow path of the female connector 100 is opened when the valve core 136 is in the first open position.

The valve core 136 may include a valve core head 140 and a bracket 142. A sealing member 144 may be provided between the outer peripheral surface of the valve core head 140 and the inner peripheral surface of the first tubular body 104. In the illustrated embodiment, the sealing member 144 is embedded in the outer periphery of the valve core head 140 for sealing contact with the inner peripheral surface of the port 126 of the plug end 124. The valve core 136 may be formed by injection molding.

One end of the elastic member 138 may abut against the bracket 142 of the valve core 136, and the other end of the elastic member 138 may abut against the first inner stepped portion 132 of the housing 102, so as to bias the valve core 136 toward the first closed position for blocking the port 126. When the valve core 136 is biased in the first closed position by the elastic member 138, the valve core head 140 is in sealing contact with the inner peripheral surface of the port 126, so that the flow path of the female connector 100 is cut off. When the valve core 136 is pushed by an external force along the first axial direction A1, the valve core 136 can move away from the port 126 to the first open position against the elastic force of the elastic member 138, so that the flow path of the female connector 100 is opened. The elastic member 138 may be in the form of a coil spring.

As shown in FIG. 18C, when the valve core 136 is in the first open position, fluid can enter the first tubular body 104 from the port 126 of the first tubular body 104 and flow through a gap between the first tubular body 104 and the valve core 136, and then flow into the fluid pipeline (not shown) connected with the female connector 100. And vice versa, fluid may flow along a reverse direction into the first tubular body 104 from the fluid pipeline (not shown) connected with the female connector 100 and then flow out of the port 126 of the first tubular body 104.

Referring to FIG. 3B again, the inner periphery of the plug end 124 may define a first inner peripheral inclined surface 146 and a second inner peripheral inclined surface 148. The inner peripheral surface of the port 126, the first inner peripheral inclined surface 146, and the second inner peripheral inclined surface 148 are sequentially connected in the first axial direction A1. The first inner peripheral inclined surface 146 and the second inner peripheral inclined surface 148 are configured to guide the sealing member 144 embedded in the outer periphery of the valve core 136 to move in the first axial direction A1 into sealing contact with the inner peripheral surface of the port 126. The first inner peripheral inclined surface 146 and the second inner peripheral inclined surface 148 respectively form a first angle and a second angle with respect to the first axial direction A1, and the first angle is smaller than the second angle. The first angle may range from, for example, 5° to 15°. By guiding the sealing member 144 of the valve core 136 into the port 126 along the two inner peripheral inclined surfaces, inclination angles of which with respect to the first axial direction A1 decrease in turn, the elastic force, to be provided by the elastic member 138 and required for the valve core 136 to move, for example, from the first open position to the first closed position for blocking the port 126, may be reduced. Since the elastic member 138 only needs to provide a small elastic force, the service life of the elastic member 138 can be prolonged, thereby improving the service life of the female connector 100. In addition, this arrangement allows using an elastic member 138 with a lower elastic modulus for returning the valve core 136 to the first closed position, making assembly of the female connector 100 easier.

Referring to FIGS. 3A, 4C, 5A, and 6A to 6C, the locking sleeve 108 of the female connector 100 may be coaxially sleeved outside the first tubular body 104 in a rotatable manner.

The locking sleeve 108 has a first end 150 and a second end 152. The locking sleeve 108 may further have a shoulder 154 extending radially inward. The housing 102 may have a first limiting portion 156. The first tubular body 104 may have a second limiting portion 158 arranged on the outer periphery of the first tubular body 104. The shoulder 154 of the locking sleeve 108 may be confined between the first limiting portion 156 and the second limiting portion 158. In the illustrated embodiment, the first limiting portion 156 of the housing 102 may be an axial end of the housing 102, the second limiting portion 158 of the first tubular body 104 may be in the form of an annular flange, and the shoulder 154 of the locking sleeve 108 may be annular and located at the second end 152 of the locking sleeve 108.

The locking sleeve 108 may include the guiding groove 110 and the locking groove 112 which penetrate through the circumferential wall of the locking sleeve 108 and are connected to each other. In the illustrated embodiment, the guiding groove 110 may extend from the first end 150 toward the second end 152 and have an arc shape. The guiding groove 110 may have an inlet end 160 at the first end 150 of the locking sleeve 108 and an outlet end 162 away from the first end 150.

The locking groove 112 extends in the first axial direction A1, and at least part of the locking groove 112 extends from the outlet end 162 of the guiding groove 110 towards the first end 150 of the locking sleeve 108. In the illustrated embodiment, the locking groove 112 has a positioning end 164 and a locking end 166 opposite to each other. The positioning end 164 and the locking end 166 are respectively located on two sides of the outlet end 162 of the guiding groove 110. The locking end 166 is closer to the first end 150 of the locking sleeve 108 than the positioning end 164.

Referring to FIGS. 14A to 18C, while the second tubular body 204 of the male connector 200 is inserted between the locking sleeve 108 and the first tubular body 104 of the female connector 100 under the action of an external force, the locking protrusion 208 moves along the guiding groove 110 and enters the positioning end 164. After the locking protrusion 208 enters the positioning end 164 of the locking groove 112 and the external force is removed, the locking protrusion 208 would move from the positioning end 164 to the locking end 166 and engage with the locking end 166 to lock the female connector 100 to the male connector 200 since the valve assembly 206 and the valve unit 106 interact with each other and tend to disengage from each other. This will be explained in detail below.

With reference to FIGS. 6B and 6C, an angle between a first radial direction R1, pointed towards the inlet end 160, of the locking sleeve 108 and a second radial direction R2, pointed towards the outlet end 162, of the locking sleeve 108 is less than 90°. Preferably, the angle ranges from 30° to 60°. More preferably, the angle is 45°.

When the second tubular body 204 of the male connector 200 is inserted between the locking sleeve 108 and the first tubular body 104 of the female connector 100 under the action of an external force, the locking protrusion 208 moves along the guiding groove 110 and applies a circumferential component force to the locking sleeve 108, so that the locking sleeve 108 rotates. If the angle is too large, the locking protrusion 208 will be jammed when moving along the guiding groove 110, so that the locking sleeve 108 cannot be rotated in place, and thus the locking protrusion 208 cannot enter the locking groove 112 for final locking. If the angle is too small, the substantially triangular wall portion of the locking sleeve 108 between the guiding groove 110, the locking groove 112 and the first end 150 will be relatively weak and cannot meet the pull-out resistance requirement of the connector assembly 10. In this case, when the male connector 200 and the female connector 100 are locked to each other and the male connector 200 is subjected to an unexpected pulling force, the locking sleeve 108 may be damaged by the pulling force, which in turn causes the male connector 200 to be disconnected from the female connector 100.

Referring to FIG. 3A again, during assembly of the female connector 100, the locking sleeve 108 is sleeved outside the first tubular body 104 first, then the valve unit 106 is arranged inside the first tubular body 104, and the fixing end 122 of the first tubular body 104 is inserted into the first receiving section 116 of the housing 102, so that the shoulder 154 of the locking sleeve 108 is positioned between the first limiting portion 156 of the housing 102 and the second limiting portion 158 of the first tubular body 104. Then, the fixing end 122 of the first tubular body 104 is fixed to the first receiving section 116 of the housing 102 by, for example, welding in the circumferential direction. So far, the assembly of the female connector 100 is finished. The above assembly process is only illustrative rather than restrictive.

FIGS. 8A to 13B illustrate the male connector 200 of the connector assembly 10 according to the first embodiment of the present application and its various components.

Referring to FIGS. 10A to 10D, the casing 202 of the male connector 200 may be substantially tubular, and include a second connection section 210, a third receiving section 212 and a fourth receiving section 214 connected to each other in sequence. In the illustrated embodiment, the second connection section 210 may be in the form of a threaded connection section and may, for example, be fixed to a device using the connector assembly 10. For example, the second connection section 210 may be threadedly engaged with a threaded hole (not shown) in a casing wall of a battery pack of a new energy vehicle, so as to be fixed to the battery pack. The casing 202 of the male connector 200 may be formed by injection molding.

Figure 11A:
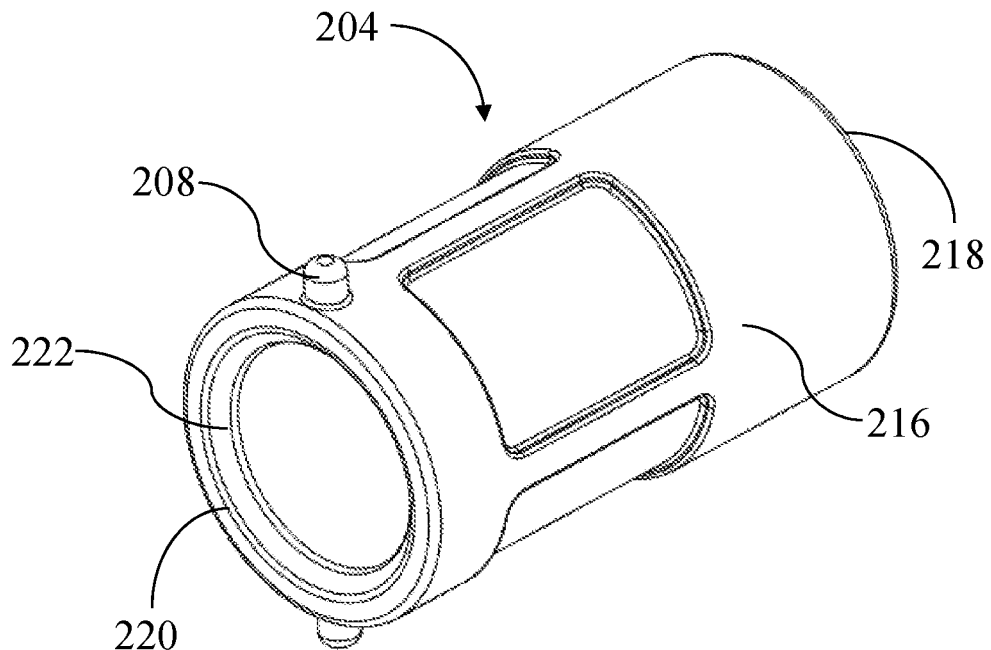
FIG. 11A and FIG. 11B respectively are a perspective view and a front view of a second tubular body of the male connector of the connector assembly according to the first embodiment of the present application.
Figure 11B:
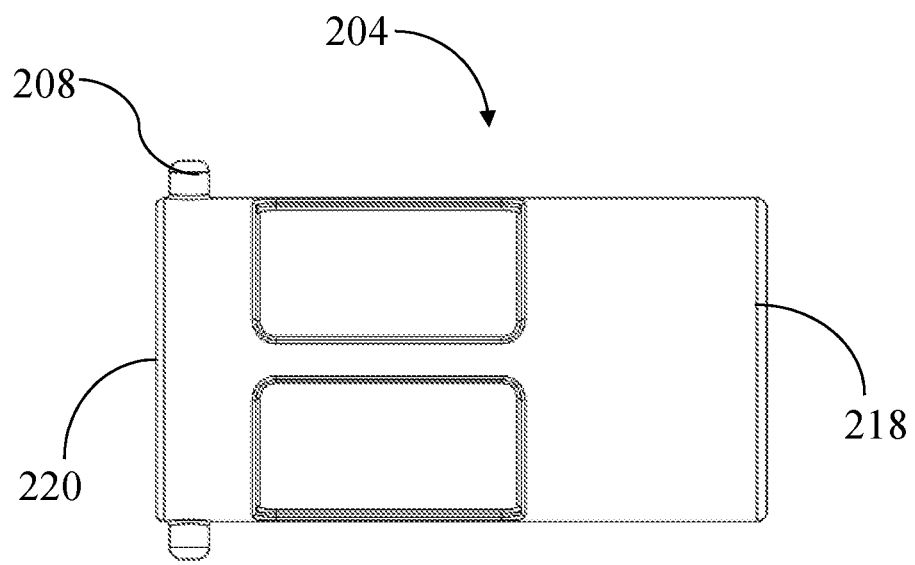

Referring to FIGS. 11A and 11B, the second tubular body 204 may include a second tubular main body 216 and the locking protrusion 208. The second tubular main body 216 may be substantially tubular and include a fixing end 218 and a plug end 220. The plug end 220 of the second tubular main body 216 defines an opening 222. Optionally, the locking protrusion 208 may be made of metal, the second tubular main body 216 may be made of plastic, and the second tubular main body 216 and the locking protrusion 208 may be integrally formed by insert injection molding, so as to improve the pull-out resistance of the connector assembly 10.

In the illustrated embodiment, the second tubular body 204 may include two locking protrusions 208 oppositely arranged in its radial direction. Accordingly, the locking sleeve 108 of the female connector 100 may have two guiding grooves 110 and two locking grooves 112.

Figure 9:
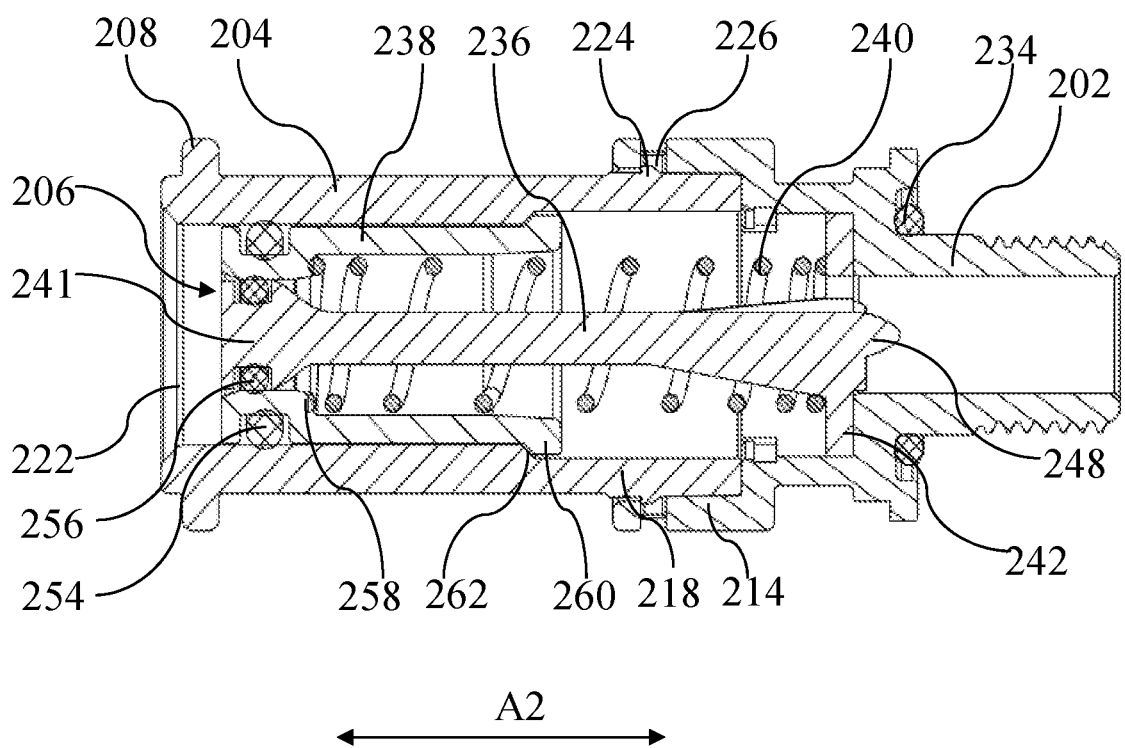
FIG. 9 is a cross-sectional view of the male connector of the connector assembly according to the first embodiment of the present application.

With reference to FIG. 9, the second tubular body 204 of the male connector 200 is at least partially received within the fourth receiving section 214 of the casing 202, and is fixed to the fourth receiving section 214 of the casing 202.

The fourth receiving section 214 of the casing 202 is configured to be capable of being mated with the fixing end 218 of the second tubular body 204. Optionally, the fourth receiving section 214 may be in interference fit with the fixing end 218 of the second tubular body 204, such that the fixing end 218 of the second tubular body 204 is fixed to the fourth receiving section 214.

Optionally, the fourth receiving section 214 and the fixing end 218 of the second tubular body 204 may be further fixed to each other by welding in the circumferential direction to provide higher fixing strength and achieve the sealing between the fourth receiving section 214 and the second tubular body 204, thereby reducing the use of sealing members and saving costs.

Optionally, as shown in FIG. 9, the outer peripheral surface of the fixing end 218 of the second tubular body 204 may be provided with a second positioning protrusion 224, and the circumferential wall of the fourth receiving section 214 may be correspondingly provided with a second positioning recess 226. The second positioning protrusion 224 and the second positioning recess 226 may be engaged with each other by snap fit, so as to improve the fixing strength of the fixing end 218 of the second tubular body 204 and the fourth receiving section 214.

It is conceivable that the casing 202 and the second tubular body 204 may be fixed to each other by interference fit, snap fit, welding or any combination thereof.

Figure 10A:
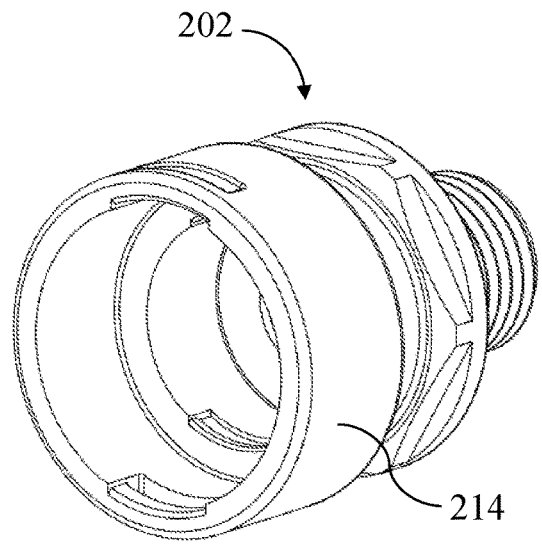
FIG. 10A and FIG. 10B respectively are perspective views of a casing of the male connector of the connector assembly according to the first embodiment of the present application, viewed from different perspectives.
Figure 10B:
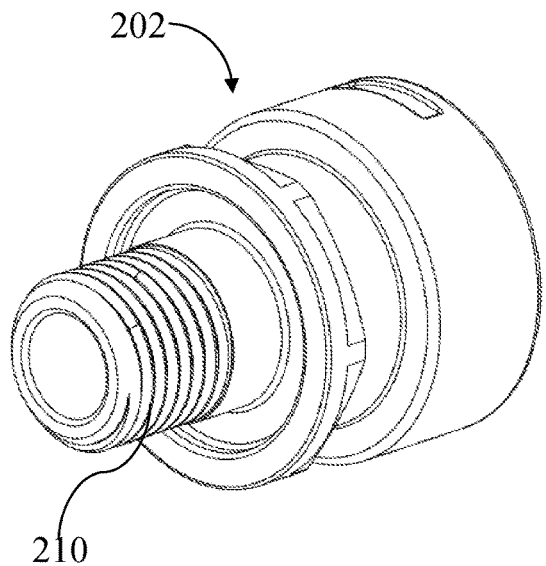
Figure 10C:
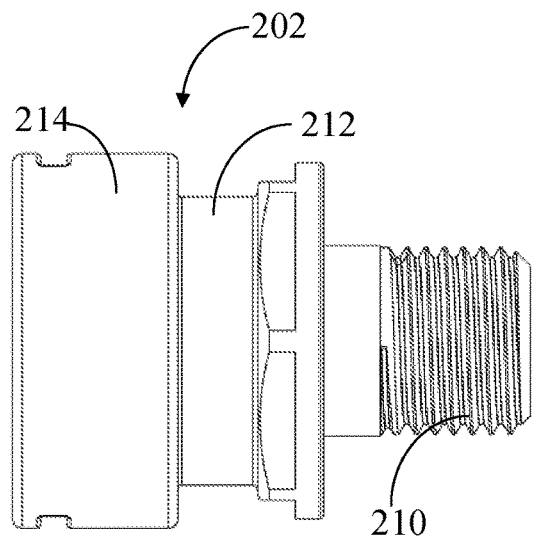
FIG. 10C and FIG. 10D respectively are a front view and a cross-sectional view of the casing of the male connector of the connector assembly according to the first embodiment of the present application.
Figure 10D:
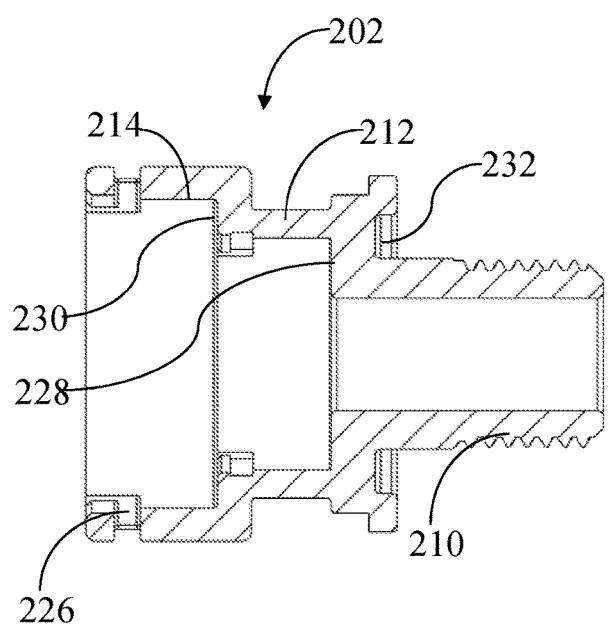

In addition, referring to FIG. 9, FIG. 10D and FIG. 14C, the third receiving section 212 of the casing 202 is configured to be capable of being mated with the first tubular body 104 of the female connector 100. In other words, according to the actual application requirements, for example, in the case that the housing of the female connector 100 needs to have a threaded connection section, the casing 202 of the male connector 200 can also be used as the housing of the female connector 100 and be assembled and fixed with the first tubular body 104 of the female connector 100, so that there is no need to manufacture a new mold for a housing having a threaded connection section for the female connector 100.

Thus, the third receiving section 212 and the fourth receiving section 214 of the casing 202 can respectively be mated with the first tubular body 104 of the female connector 100 and the second tubular body 204 of the male connector 200, which can reduce the number of injection molds required for manufacturing the connector assembly 10 and significantly reduce manufacturing costs, as will be explained further below.

The third receiving section 212 has a larger diameter than the second connection section 210, and the fourth receiving section 214 has a larger diameter than the third receiving section 212, so that a third inner stepped portion 228 is formed between the second connection section 210 and the third receiving section 212, and a fourth inner stepped portion 230 is formed between the third receiving section 212 and the fourth receiving section 214. The fourth inner stepped portion 230 is configured to limit the second tubular body 204 when the fourth receiving section 214 is mated with the second tubular body 204.

In addition, an outer stepped portion 232 (shown in FIG. 10D) is further formed between the second connection section 210 and the third receiving section 212. A sealing member 234 (as shown in FIG. 9) may be embedded in the outer stepped portion 232 to achieve a sealing connection between the casing 202 and a casing wall of the battery pack of the new energy vehicle, for example.

Referring to FIG. 9, the valve assembly 206 of the male connector 200 includes a valve stem 236, a sliding sleeve 238 and an elastic element 240. The valve stem 236 includes at two ends thereof a valve stem head portion 241 and a valve stem base portion 242 respectively. The sliding sleeve 238 is arranged in the second tubular body 204 and is sleeved outside the valve stem 236, and the sliding sleeve 238 is slidable between a second closed position and a second open position along the second axial direction A2. Two ends of the elastic element 240 respectively abut against the sliding sleeve 238 and the valve stem base portion 242 to bias the sliding sleeve 238 toward the second closed position. The sliding sleeve 238 blocks an annular gap between the second tubular body 204 and the valve stem head portion 241 to cut off a flow path of the male connector 200 when the sliding sleeve 238 is in the second closed position, and the flow path of the male connector 200 is opened when the sliding sleeve 238 is in the second open position. The valve stem 236 and the sliding sleeve 238 may be formed by injection molding.

Figure 12A:
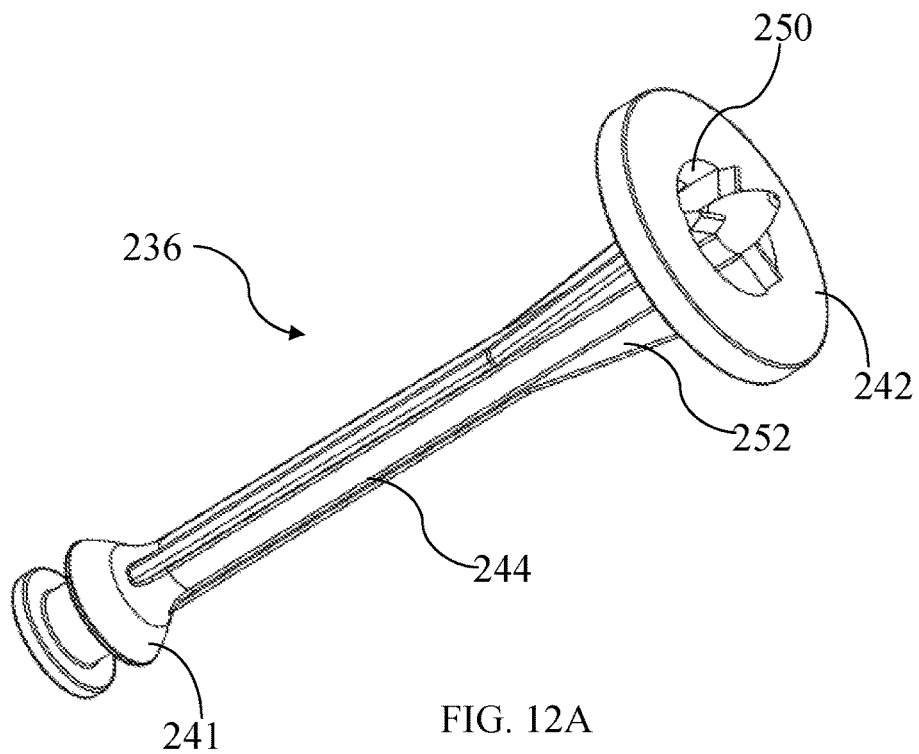
FIG. 12A and FIG. 12B respectively are a perspective view and a front view of a valve stem of the male connector of the connector assembly according to the first embodiment of the present application.
Figure 12B:
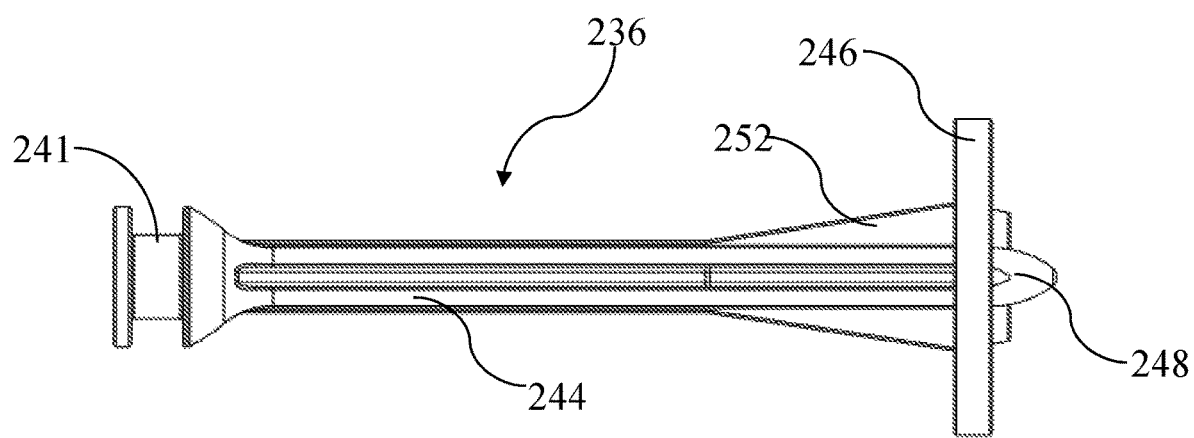

Referring to FIG. 9, FIG. 12A and FIG. 12B, the valve stem 236 may be positioned in the second tubular body 204 in the second axial direction A2. The valve stem 236 may include the valve stem head portion 241, the valve stem base portion 242, and a valve stem middle portion 244 connecting the valve stem head portion 241 with the valve stem base portion 242. In the illustrated embodiment, the valve stem 236 is integrally formed.

The valve stem base portion 242 includes a base body 246 and a projection 248. The base body 246 may be provided with a through hole 250 penetrating through the base body 246 for fluid to flow therethrough. The projection 248 extends from the center of the base body 246 and away from the valve stem head portion 241 in the second axial direction A2. The projection 248 tapers in a direction away from the valve stem head portion 241, so as to prevent the size of the cross section of the flow path of the male connector 200 from abruptly changing near the base body 246, thereby avoiding turbulence. In the illustrated embodiment, the projection 248 is in the shape of a semi-ellipsoid. The valve stem middle portion 244 may be provided with multiple reinforcing ribs 252 to increase the strength of the valve stem 236.

Figure 13A:
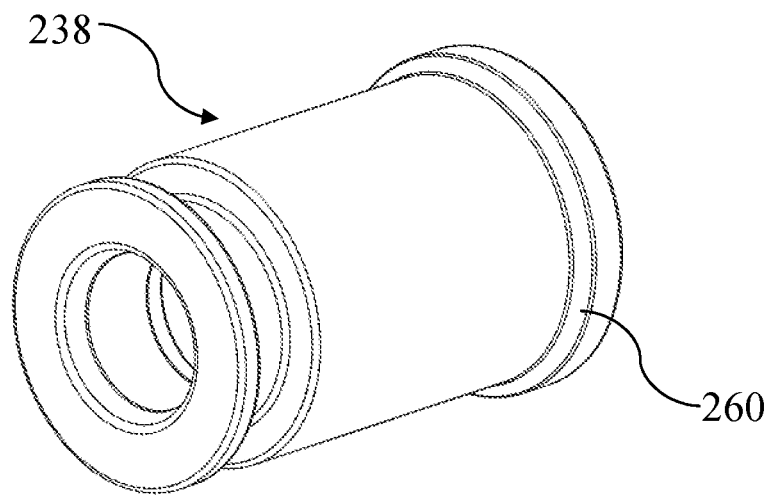
FIG. 13A and FIG. 13B respectively are a perspective view and a front view of a sliding sleeve of the male connector of the connector assembly according to the first embodiment of the present application.
Figure 13B:
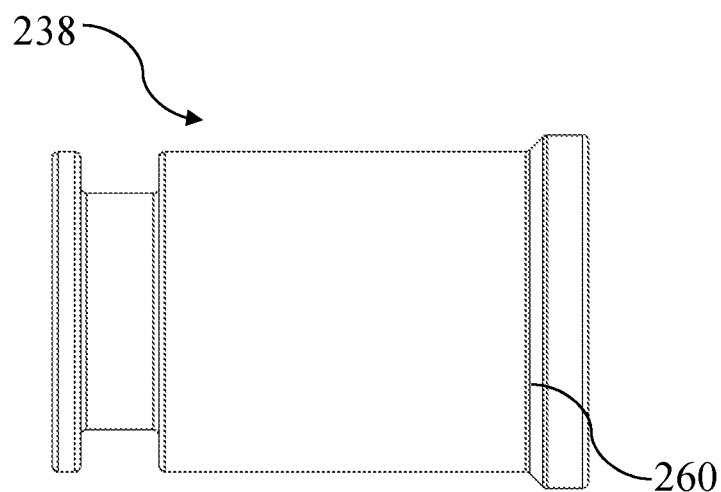

Referring to FIG. 9, FIG. 13A, and FIG. 13B, the sliding sleeve 238 is arranged in the second tubular body 204 and is sleeved outside the valve stem 236. The sliding sleeve 238 is slidable between the second closed position and the second open position along the second axial direction A2. A sealing member 254 is provided between the outer peripheral surface of the sliding sleeve 238 and the inner peripheral surface of the second tubular body 204. A sealing member 256 is provided between the inner peripheral surface of the sliding sleeve 238 and the outer peripheral surface of the valve stem head portion 241.

Two ends of the elastic element 240 abut against an inner stepped portion 258 of the sliding sleeve 238 and the valve stem base portion 242 respectively. The sliding sleeve 238 is biased towards the second closed position by the elastic force of the elastic element 240. The outer periphery of the sliding sleeve 238 is provided with a limiting protrusion 260. The inner circumference of the second tubular body 204 is provided with a limiting surface 262. The limiting protrusion 260 and the limiting surface 262 may abut against each other to limit the sliding sleeve 238 in the second closed position where the sliding sleeve 238 is in sealing contact with the valve stem head portion 241. The elastic element 240 may be in the form of a coil spring.

When the sliding sleeve 238 is biased in the second closed position by the elastic element 240, the sliding sleeve 238 cooperates with the sealing members 254 and 256 to block the annular gap between the second tubular body 204 and the valve stem head portion 241 to cut off the flow path of the male connector 200. When the sliding sleeve 238 is pushed by an external force in the second axial direction A2, the sliding sleeve 238 can move away from the valve stem head portion 241 to the second open position against the elastic force of the elastic element 240, so that the flow path of the male connector 200 is opened.

As shown in FIG. 18C, when the sliding sleeve 238 is in the second open position, fluid can enter the casing 202 through the gap between the sliding sleeve 238 and the valve stem 236, then flow through the through hole 250 of the valve stem 236, and then flow into the fluid pipeline (not shown) connected with the male connector 200. And vice versa, fluid may flow along a reverse direction into the casing 202 from the fluid pipeline connected with the male connector 200 and then flow out through the gap between the sliding sleeve 238 and the valve stem 236.

Referring to FIG. 9 again, during assembly of the male connector 200, the valve assembly 206 is arranged inside the second tubular body 204 first, and the fixing end 218 of the second tubular body 204 is inserted into the fourth receiving section 214 of the casing 202. Then, the fixing end 218 of the second tubular body 204 is fixed to the fourth receiving section 214 of the casing 202 by, for example, welding in the circumferential direction. So far, the assembly of the male connector 200 is finished. The above assembly process is only illustrative rather than restrictive.

Hereinafter, the process of connecting and locking the female connector 100 to the male connector 200 of the connector assembly 10 according to the first embodiment of the present application will be described with reference to FIGS. 14A to 18C.

FIG. 14A to FIG. 14C show a state in which the female connector 100 and the male connector 200 are disconnected from each other. In this state, the valve core 136 of the female connector 100 is in the first closed position, and the sliding sleeve 238 of the male connector 200 is in the second closed position.

Figure 15A:
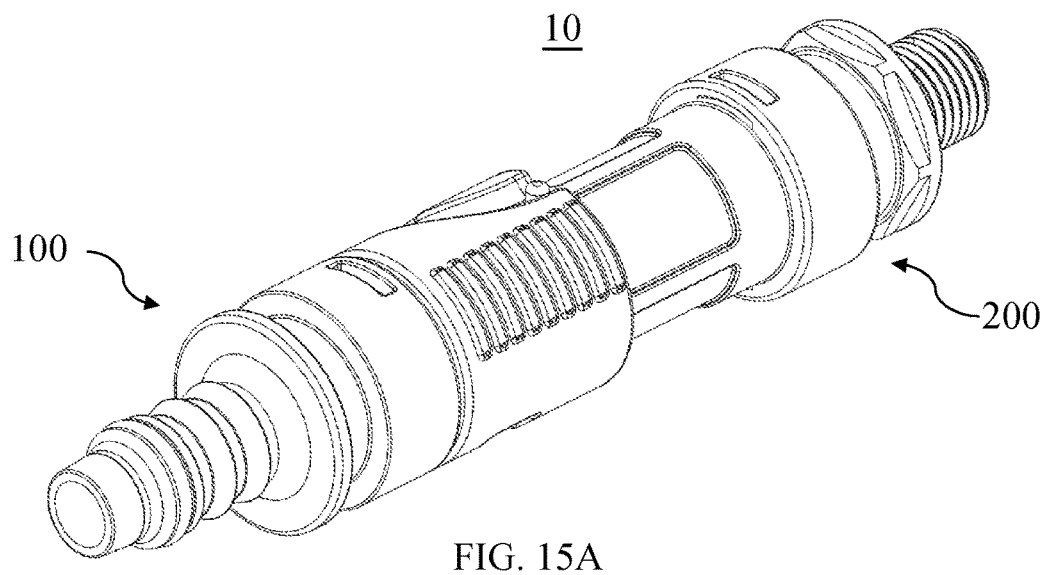
FIG. 15A to FIG. 15C respectively are a perspective view, a front view, and a cross-sectional view of the female connector and the male connector of the connector assembly according to the first embodiment of the present application, when the female connector and the male connector are in initial contact with each other during the connection thereof.
Figure 15B:
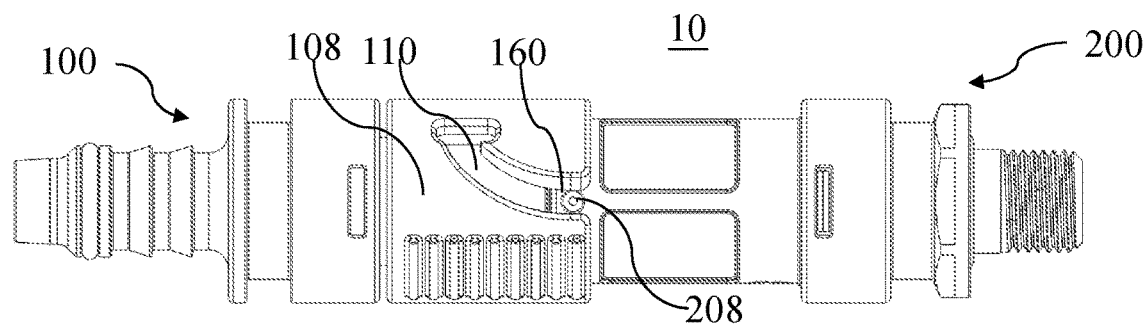
Figure 15C:
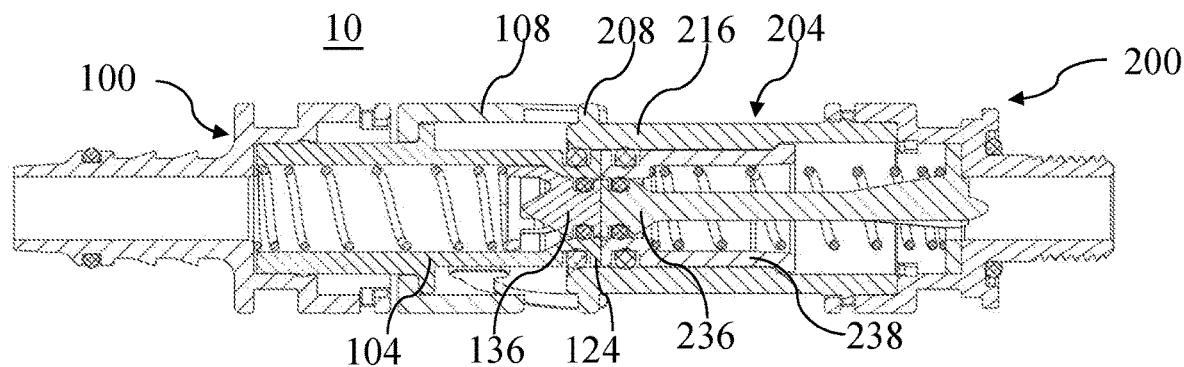

During the connection of the female connector 100 and the male connector 200, as shown in FIGS. 15A to 15C, the operator may first insert the second tubular body 204 of the male connector 200 between the first tubular body 104 and the locking sleeve 108 of the female connector 100, so that the locking protrusion 208 of the second tubular body 204 is inserted into the inlet end 160 of the guiding groove 110 of the locking sleeve 108. At this time, the valve stem 236 and the sliding sleeve 238 of the male connector 200 just come into contact with the valve core 136 and the plug end 124 of the first tubular body 104 of the female connector 100, respectively.

Figure 16A:
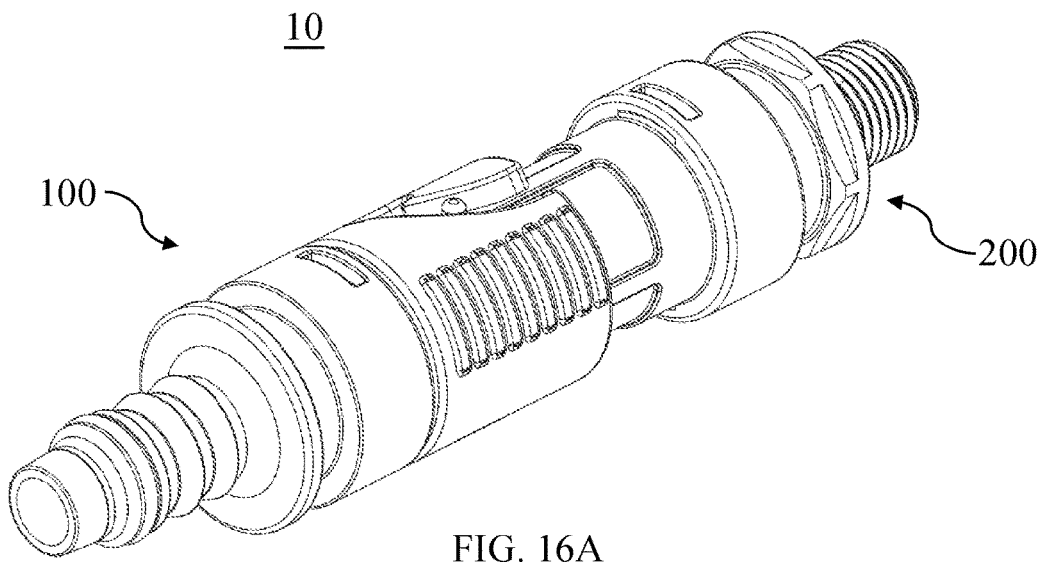
FIG. 16A to FIG. 16C respectively are a perspective view, a front view, and a cross-sectional view of the female connector and the male connector of the connector assembly according to the first embodiment of the present application, when a locking protrusion is moving along a guiding groove during the connection of the female connector and the male connector.
Figure 16B:
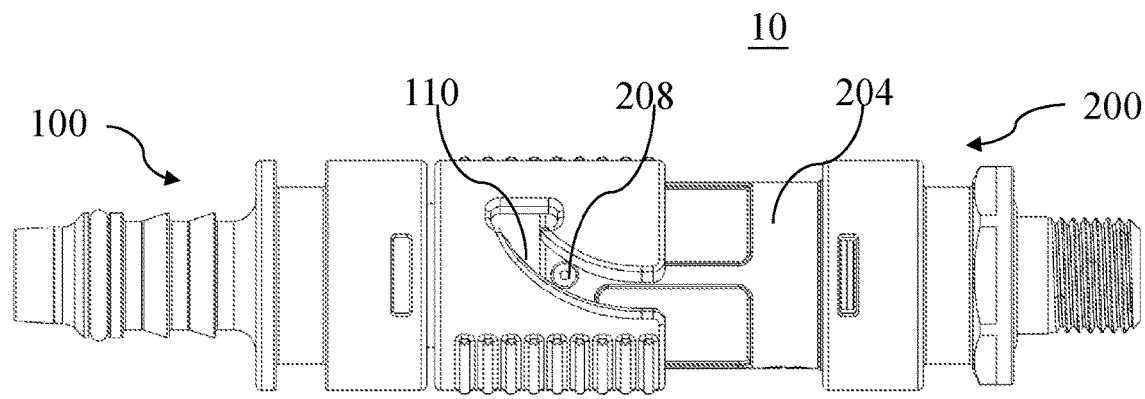
Figure 16C:
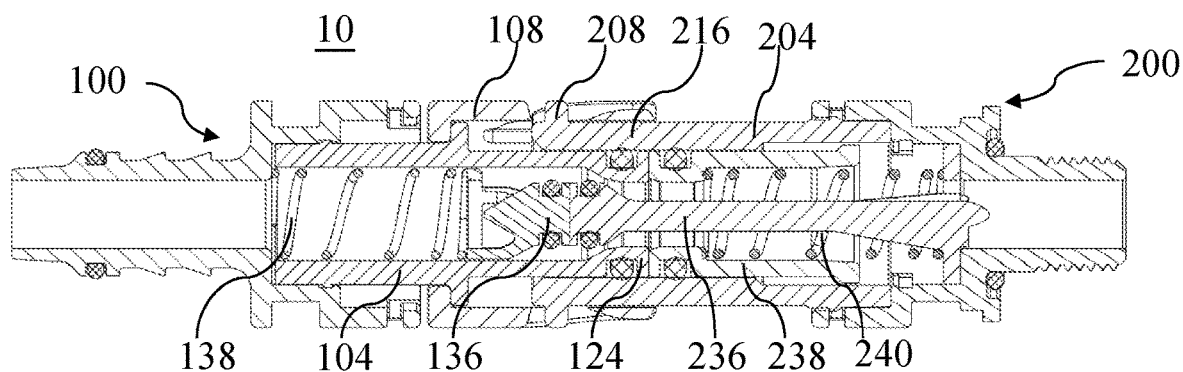

As the second tubular body 204 is further inserted, as shown in FIGS. 16A to 16C, the locking protrusion 208 moves along the guiding groove 110 and drives the locking sleeve 108 to rotate. During this process, the valve stem 236 of the male connector 200 pushes the valve core 136 from the first closed position toward the first open position against the elastic force of the elastic member 138 of the female connector 100, and the plug end 124 of the female connector 100 pushes the sliding sleeve 238 from the second closed position toward the second open position against the elastic force of the elastic element 240 of the male connector 200.

Figure 17A:
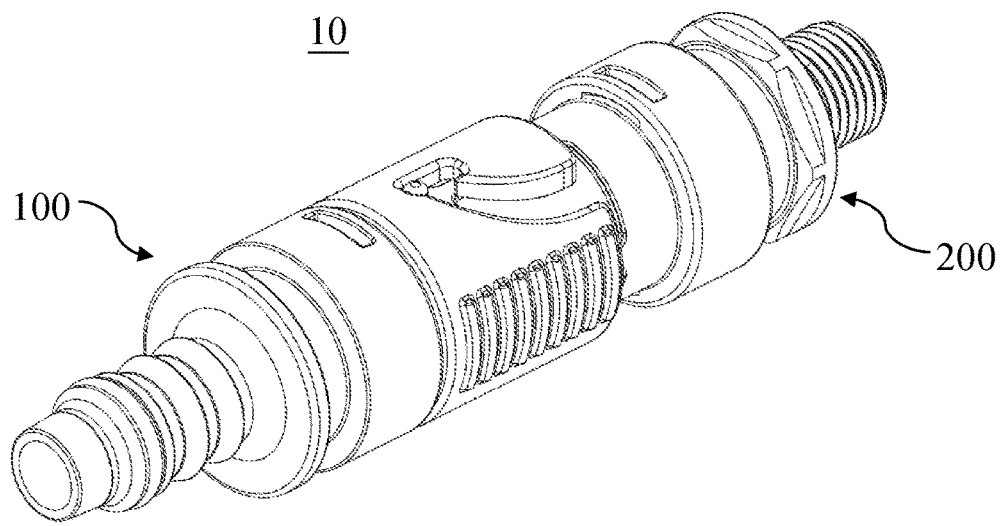
FIG. 17A to FIG. 17C respectively are a perspective view, a front view, and a cross-sectional view of the female connector and the male connector of the connector assembly according to the first embodiment of the present application, when the locking protrusion enters a positioning end of a locking groove during the connection of the female connector and the male connector.
Figure 17B:
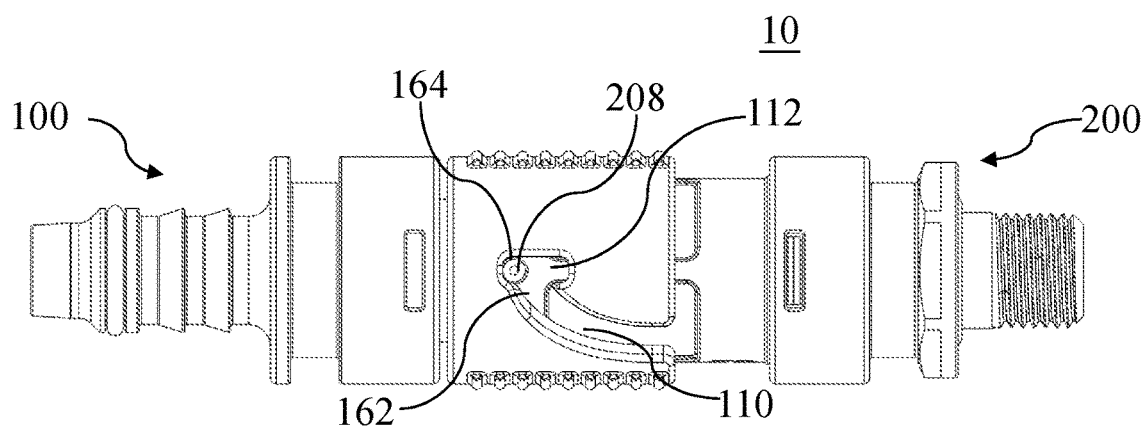
Figure 17C:
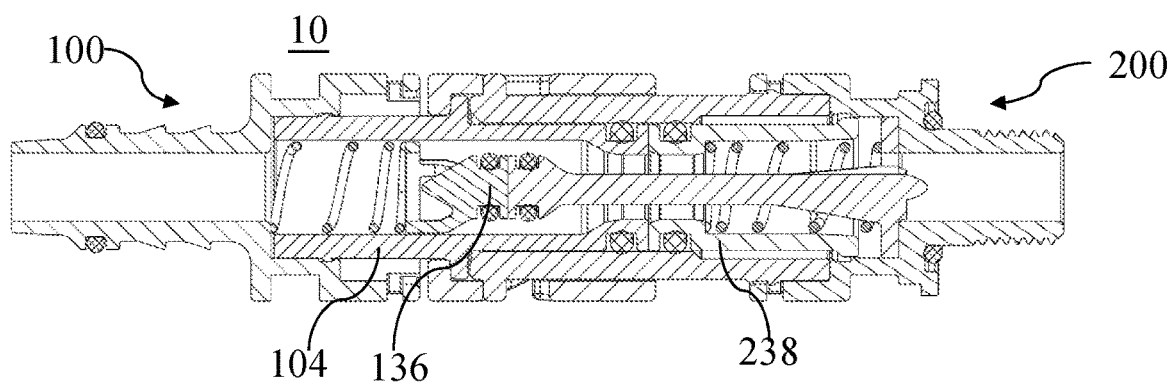

Then, as shown in FIGS. 17A to 17C, the locking protrusion 208 enters the positioning end 164 of the locking groove 112. Since the positioning end 164 of the locking groove 112 is located on one side of the outlet end 162 of the arc-shaped guiding groove 110 and there is a non-smooth transition between the outlet end 162 of the guiding groove 110 and the positioning end 164 of the locking groove 112, the operator would get tactile feedback when the locking protrusion 208 enters the positioning end 164 of the locking groove 112, and stop applying the insertion force to the male connector 200.

Figure 18A:
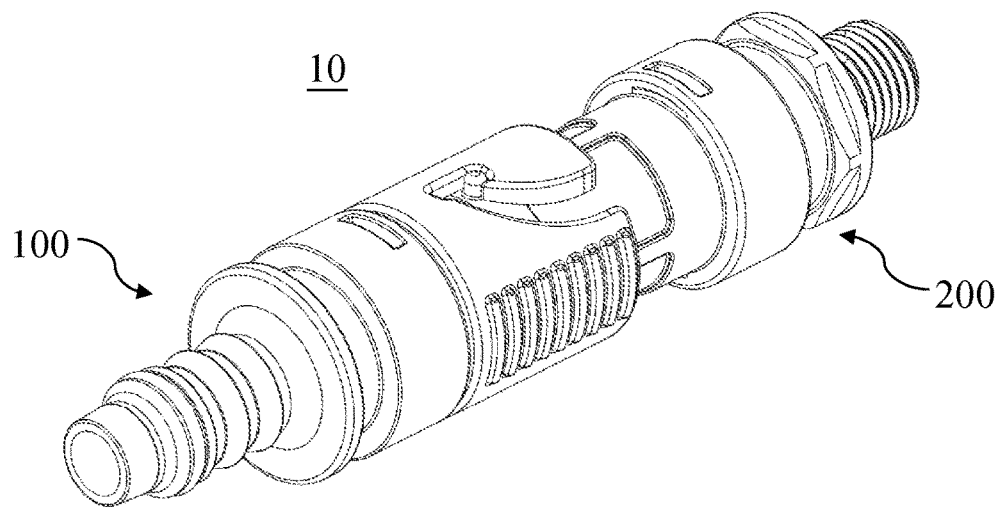
FIG. 18A to FIG. 18C respectively are a perspective view, a front view, and a cross-sectional view of the female connector and the male connector of the connector assembly according to the first embodiment of the present application, when the female connector and the male connector are locked to each other, wherein the locking protrusion is engaged with a locking end of the locking groove.
Figure 18B:
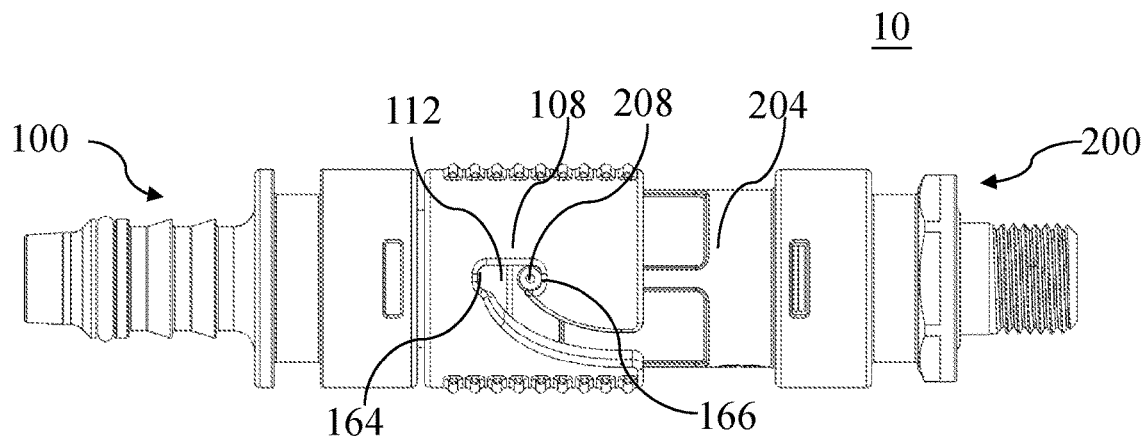
Figure 18C:
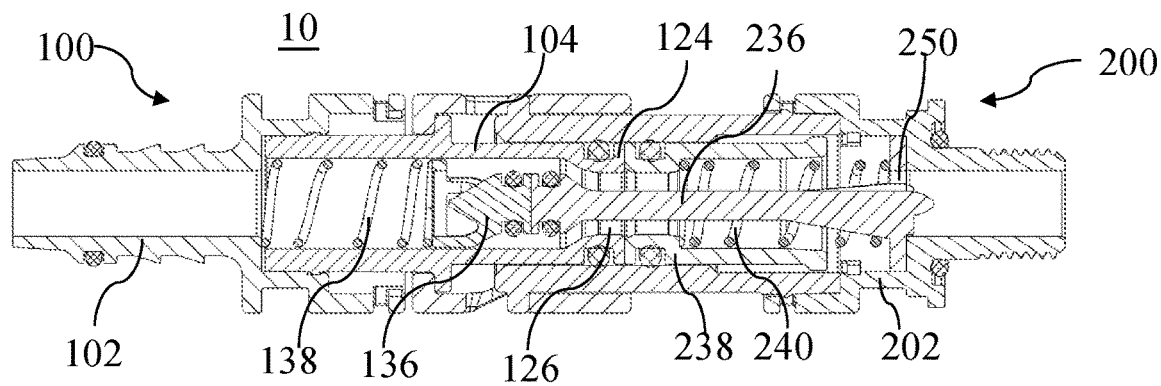

Then, as shown in FIGS. 18A to 18C, the female connector 100 and the male connector 200 tend to disengage/move away from each other under the action of the respective elastic forces of the elastic member 138 and the elastic element 240, so that the locking protrusion 208 of the male connector 200 moves from the positioning end 164 of the locking groove 112 to the locking end 166 and engages with the locking end 166, so as to prevent the second tubular body 204 of the male connector 200 from disengaging from the locking sleeve 108, thereby locking the female connector 100 and the male connector 200 to each other. At this time, the valve core 136 of the female connector 100 is in the first open position, the sliding sleeve 238 of the male connector 200 is in the second open position, and the respective flow paths of the female connector 100 and the male connector 200 are opened and in fluid communication with each other.

Arranging the locking sleeve 108 in a rotatable manner allows the female connector 100 to be connected and locked with the male connector 200 by means of straight insertion operation of the female connector and/or male connector during the connection of the female connector 100 and the male connector 200. This straight insertion operation requires a smaller operation space and is convenient to operate, and is especially suitable for, for example, a battery pack with a small interior space of a new energy vehicle. And during the straight insertion operation, there is no need to rotate the housing 102 of the female connector 100. This avoids the rotational resistance due to the fluid pipeline connected to the housing 102 of the female connector 100 when the housing 102 of the female connector 100 is rotated, and also reduces stress at the connection between the housing 102 of the female connector 100 and the fluid pipeline connected thereto.

Figure 19A:
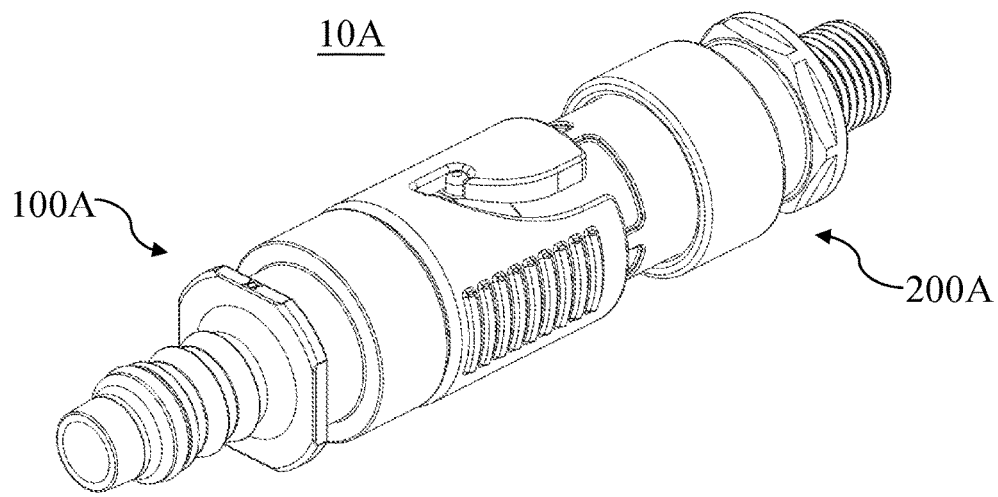
FIG. 19A to FIG. 19C respectively are a perspective view, a front view, and a cross-sectional view of a connector assembly according to a second embodiment of the present application.
Figure 19B:
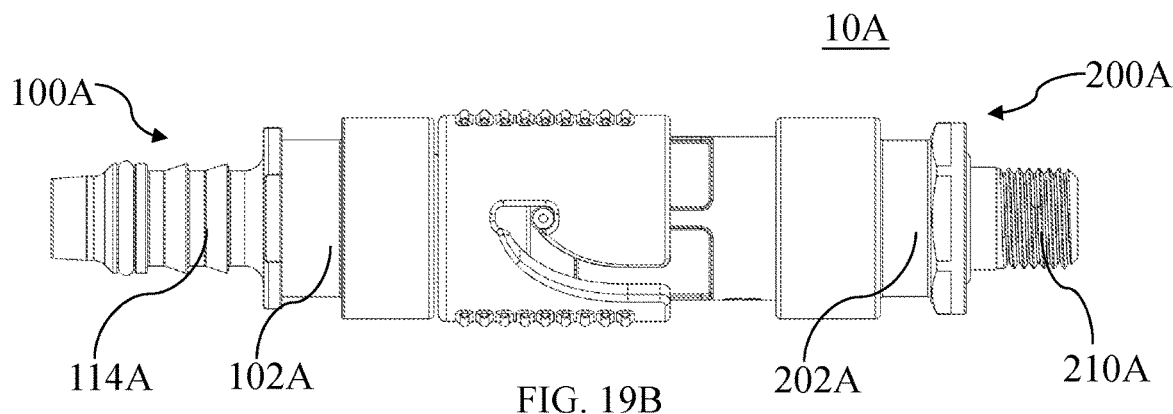
Figure 19C:
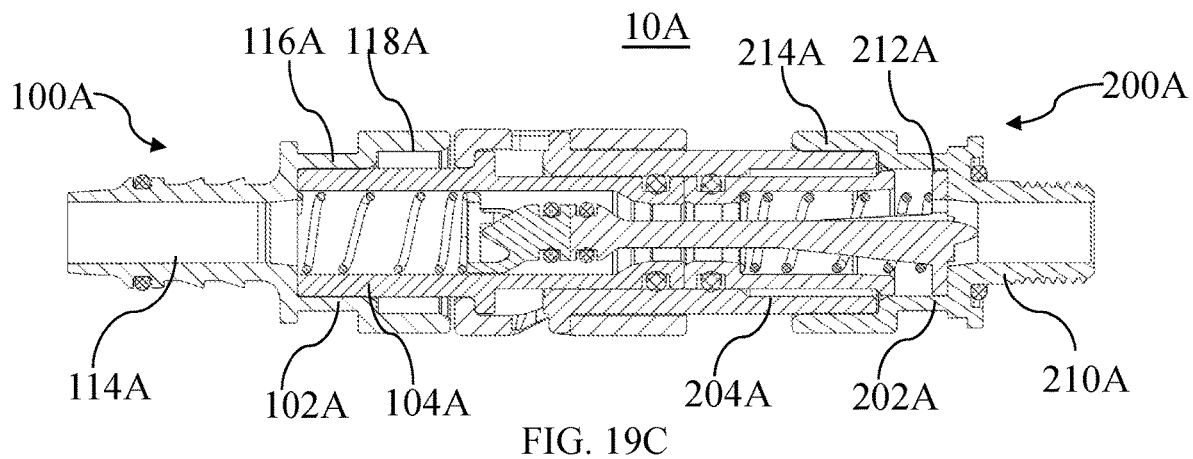

FIG. 19A to FIG. 19C illustrate a connector assembly 10A according to a second embodiment of the present application. The connector assembly 10A according to the second embodiment is substantially the same as the connector assembly 10 according to the first embodiment, and the only difference lies in that: the housing 102A and the first tubular body 104A of the female connector 100A of the connector assembly 10A according to the second embodiment are fixed to each other by interference fit and welding, and no snap fit structure for fixing the housing 102A and the first tubular body 104A is provided; and similarly, the casing 202A and the second tubular body 204A of the male connector 200A are fixed to each other by interference fit and welding, and no snap fit structure for fixing the casing 202A and the second tubular body 204A is provided. The similarities between these two embodiments will not be repeated here.

Figure 20A:
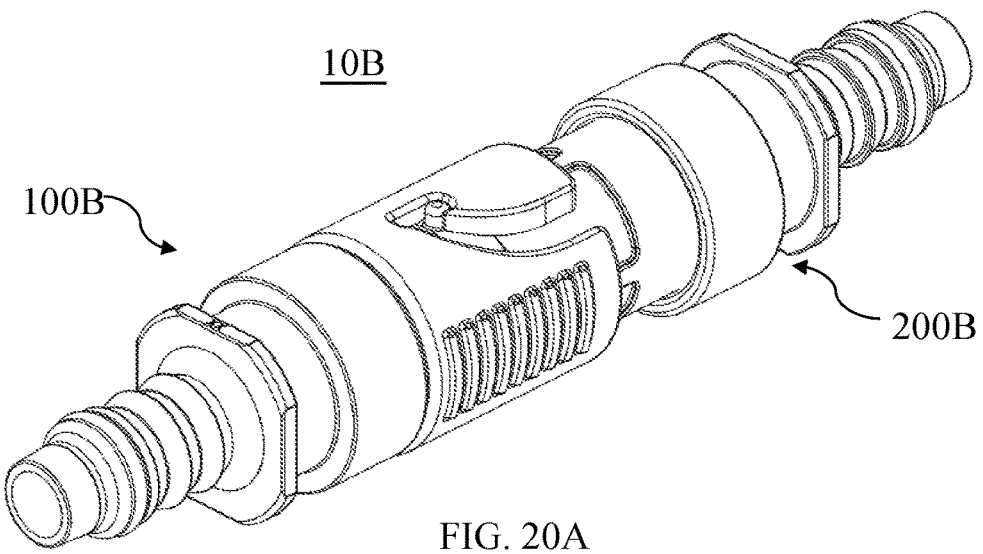
FIG. 20A to FIG. 20C respectively are a perspective view, a front view, and a cross-sectional view of a connector assembly according to a third embodiment of the present application.
Figure 20B:
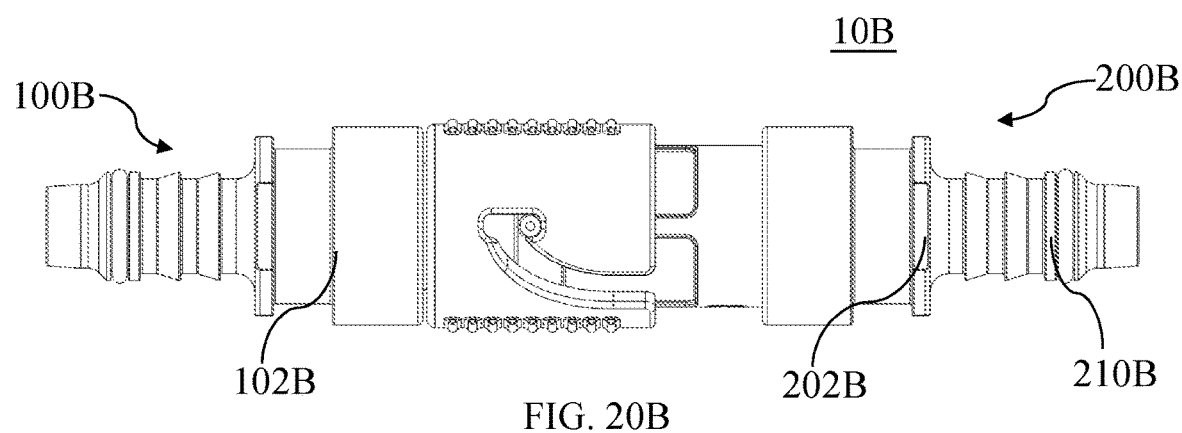
Figure 20C:
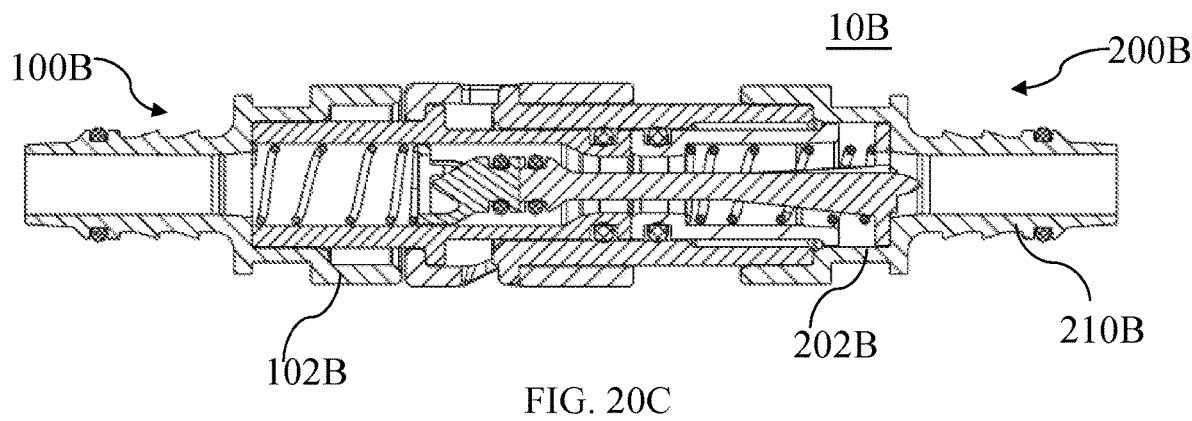

FIG. 20A to FIG. 20C illustrate a connector assembly 10B according to a third embodiment of the present application. The connector assembly 10B according to the third embodiment is substantially the same as the connector assembly 10A according to the second embodiment, and the only difference lies in that: the second connection section 210B of the casing 202B of the male connector 200B of the connector assembly 10B of the third embodiment is in the form of a hose connection section, and the casing 202B of the male connector 200B and the housing 102B of the female connector 100B have the same configuration. The similarities between these two embodiments will not be repeated here.

Figure 21A:
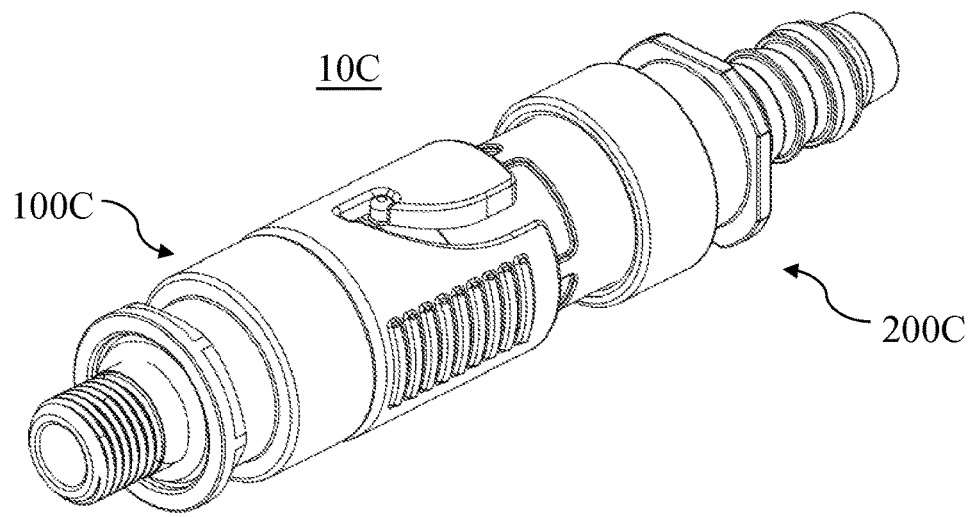
FIG. 21A to FIG. 21C respectively are a perspective view, a front view, and a cross-sectional view of a connector assembly according to a fourth embodiment of the present application.
Figure 21B:
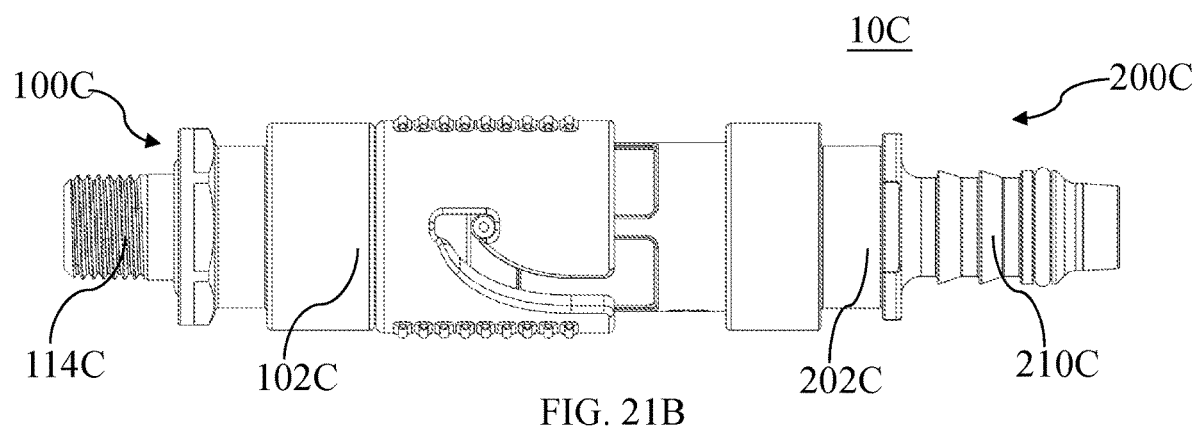
Figure 21C:
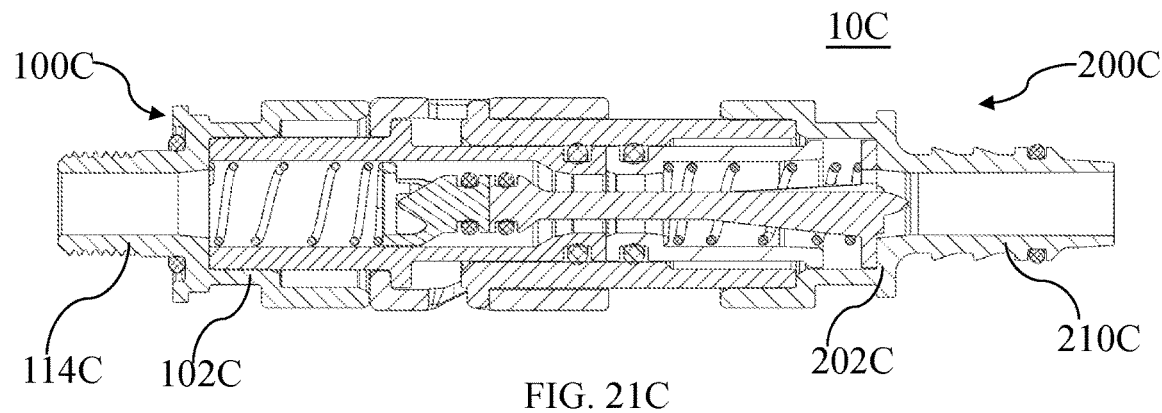

FIG. 21A to FIG. 21C illustrate a connector assembly 10C according to a fourth embodiment of the present application. The connector assembly 10C according to the fourth embodiment is substantially the same as the connector assembly 10A according to the second embodiment, and the only difference lies in that: the first connection section 114C of the housing 102C of the female connector 100C of the connector assembly 10C of the fourth embodiment is in the form of a threaded connection section, and the second connection section 210C of the casing 202C of the male connector 200C is in the form of a hose connection section. The similarities between these two embodiments will not be repeated here.

Figure 22A:
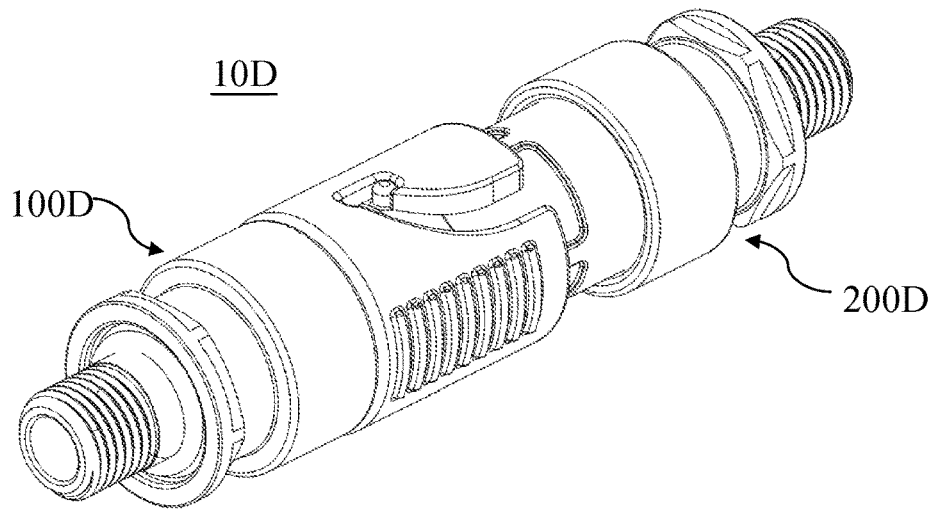
FIG. 22A to FIG. 22C respectively are a perspective view, a front view, and a cross-sectional view of a connector assembly according to a fifth embodiment of the present application.
Figure 22B:
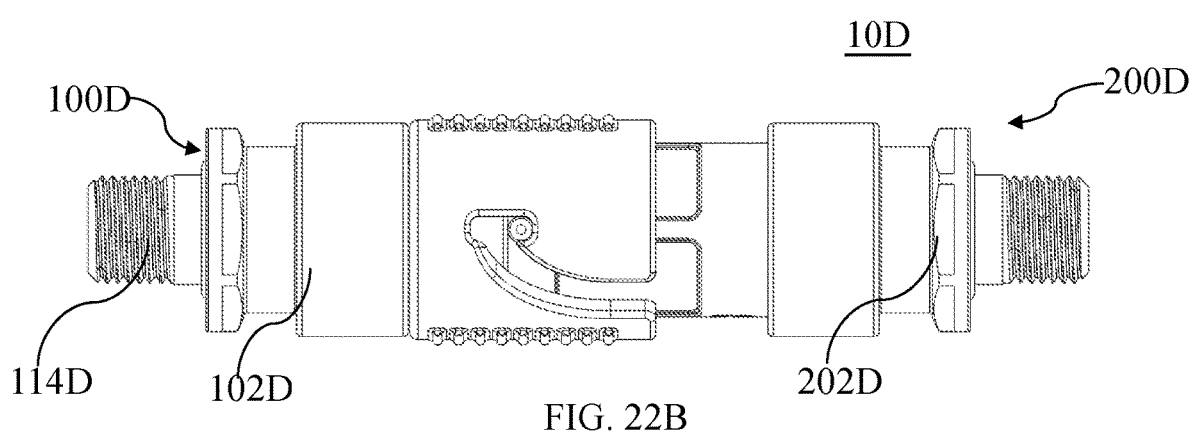
Figure 22C:
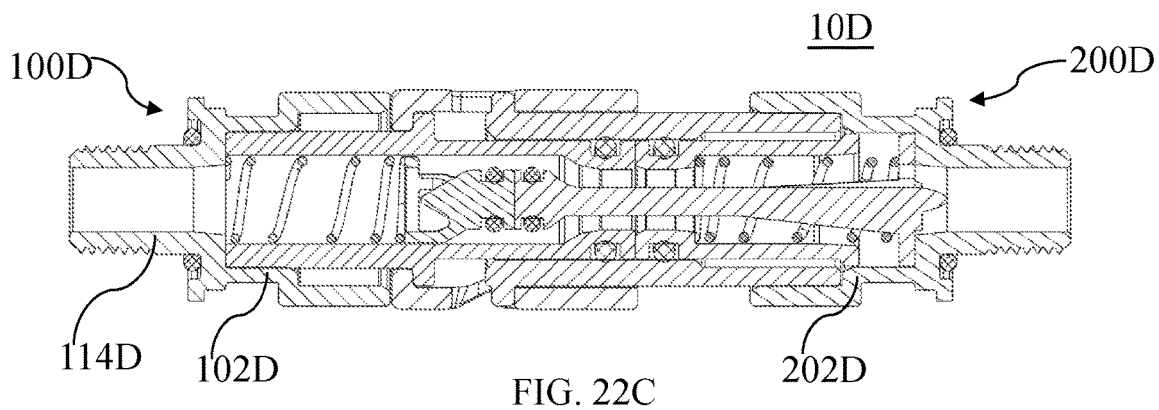

FIG. 22A to FIG. 22C illustrate a connector assembly 10D according to a fifth embodiment of the present application. The connector assembly 10D according to the fifth embodiment is substantially the same as the connector assembly 10A according to the second embodiment, and the only difference lies in that: the first connection section 114D of the housing 102D of the female connector 100D of the connector assembly 10D of the fifth embodiment is in the form of a threaded connection section, and the housing 102D of the female connector 100D and the casing 202D of the male connector 200D have the same configuration. The similarities between these two embodiments will not be repeated here.

Referring to FIGS. 19A to 22C, the connecting sections at two ends of the connector assemblies 10A, 10B, 10C, and 10D according to the second to fifth embodiments of the present application have different configurations, and can be adapted to different application scenarios.

Components, except for the housing and the casing, of the connector assemblies 10A, 10B, 10C, and 10D according to the second to fifth embodiments of the present application have the same configuration. Therefore, when manufacturing the connector assemblies according to the second to fifth embodiments of the present application, plastic components of the connector assemblies other than the housing and the casing can share the injection molds.

Besides, the housings and casings of the connector assemblies 10A, 10B, 10C, and 10D of the second to fifth embodiments may also share the injection molds. Specifically, taking the second embodiment as an example, similar to the first embodiment, referring to FIG. 19C, the first receiving section 116A and the second receiving section 118A of the housing 102A of the female connector 100A of the connector assembly 10A of the second embodiment are configured to be capable of being mated with the first tubular body 104A of the female connector 100A and the second tubular body 204A of the male connector 200A, respectively; and the third receiving section 212A and the fourth receiving section 214A of the casing 202A of the male connector 200A are configured to be capable of being mated with the first tubular body 104A of the female connector 100A and the second tubular body 204A of the male connector 200A, respectively. In other words, the housing 102A of the connector assembly 10A of the second embodiment can be mated with the first tubular body 104A and/or the second tubular body 204A according to actual needs, to be used as the housing of the female connector and/or the casing of the male connector. Similarly, the casing 202A may also be used as the housing of the female connector and/or the casing of the male connector.

Therefore, it is only necessary to customize the injection molds, for example, for the housing 102A and the casing 202A of the connector assembly 10A of the second embodiment shown in FIGS. 19A to 19C, for example, to customize a first mold and a second mold for injection molding the housing 102A and the casing 202A respectively, which can meet the requirements for the housing and the casing of the connector assemblies of the second to fifth embodiments. Specifically, both the housing 102B and the casing 202B of the connector assembly 10B of the third embodiment may have the same configuration as the housing 102A of the connector assembly 10A of the second embodiment, and be manufactured with the first mold. The housing 102C and the casing 202C of the connector assembly 10C of the fourth embodiment may respectively have the same configuration as the casing 202A and the housing 102A of the connector assembly 10A of the second embodiment, and be manufactured with the second mold and the first mold respectively. Both the housing 102D and the casing 202D of the connector assembly 10D of the fifth embodiment may have the same configuration as the casing 202A of the connector assembly 10A of the second embodiment, and be manufactured with the second mold.

In this way, the number of custom molds required for manufacturing the connector assemblies of various configurations can be significantly reduced. And since the cost of preparing molds accounts for a considerable proportion of the manufacturing cost of plastic products, the manufacturing cost of the connector assemblies can be significantly reduced, while providing the connector assemblies with various configurations and expanding the application range of the connector assemblies.

It should be understood that the embodiments shown in FIGS. 1 to 22C only illustrate the shape, size and arrangement of each optional component of the connector assembly according to the present application. However, these embodiments are merely intended to illustrate, rather than limit. Other shapes, sizes and arrangements may be adopted without departing from the idea and scope of the present application.

The technical contents and technical features of the present application have been disclosed above. However, it can be understood that, those skilled in the art can make various changes and improvements to the above-disclosed concept under the creative concept of the present application, and all these various changes and improvements still fall within the protection scope of the present application. The description of the foregoing embodiments is exemplary rather than restrictive, and the protection scope of the present application is determined by the appended claims.

The invention claimed is:

1. A connector assembly comprising a female connector and a male connector for being connected with the female connector, wherein the female connector comprises: a housing; a first tubular body defining a first axial direction, the first tubular body being at least partially received within and fixed to the housing; a valve unit at least partially arranged in the first tubular body; and a locking sleeve sleeved outside the first tubular body in a rotatable manner, wherein at least part of the locking sleeve is confined between the housing and the first tubular body in the first axial direction, and the locking sleeve comprises a guiding groove and a locking groove which are connected to each other and arranged on a circumferential wall of the locking sleeve;

the male connector comprises: a casing; a second tubular body defining a second axial direction, the second tubular body being at least partially received within and fixed to the casing, the second tubular body being configured to be insertable between the locking sleeve and the first tubular body in the first axial direction, the second tubular body comprising a locking protrusion arranged on an outer periphery thereof; and a valve assembly at least partially arranged in the second tubular body;

wherein the locking protrusion is adapted to move along the guiding groove and drive the locking sleeve to rotate until the locking protrusion enters the locking groove during the insertion of the second tubular body between the locking sleeve and the first tubular body, and wherein the locking protrusion is adapted to engage with the locking groove due to interaction of the valve assembly and the valve unit after the locking protrusion enters the locking groove, to prevent the second tubular body from disengaging from the locking sleeve, wherein the locking sleeve has a first end and a second end, the guiding groove extends from the first end towards the second end, and the guiding groove has an inlet end at the first end and an outlet end away from the first end, wherein the locking groove has a positioning end and a locking end opposite to each other, and the positioning end and the locking end are respectively located on two sides of the outlet end of the guiding groove, wherein the locking end is closer to the first end of the locking sleeve than the positioning end, and wherein there is a non-smooth transition between the outlet end of the guiding groove and the positioning end of the locking groove, wherein the locking protrusion is adapted to move along the guiding groove and enter the positioning end during the insertion of the second tubular body between the locking sleeve and the first tubular body, and the locking protrusion is further adapted to move from the positioning end to the locking end and engage with the locking end due to the interaction of the valve assembly and the valve unit after the locking protrusion enters the positioning end.

2. The connector assembly according to claim 1, wherein the housing has a first limiting portion, the first tubular body has a second limiting portion arranged on an outer periphery thereof, and the locking sleeve has a shoulder extending radially inward, and wherein the shoulder is confined between the first limiting portion and the second limiting portion.

3. The connector assembly according to claim 1, wherein the guiding groove is arc-shaped.

4. The connector assembly according to claim 3, wherein an angle between a first radial direction of the locking sleeve pointed towards the inlet end and a second radial direction of the locking sleeve pointed towards the outlet end is less than 90°.

5. The connector assembly according to claim 4, wherein the angle ranges from 30° to 60°.

6. The connector assembly according to claim 4, wherein the angle is 45°.

7. The connector assembly according to claim 1, wherein the locking groove extends in the first axial direction, and at least part of the locking groove extends from the outlet end of the guiding groove towards the first end of the locking sleeve.

8. The connector assembly according to claim 1, wherein the housing comprises a first connection section in a form of a hose connection section or a threaded connection section; and/or the casing comprises a second connection section in a form of a hose connection section or a threaded connection section.

9. The connector assembly according to claim 1, wherein the housing and the first tubular body are fixed to each other by interference fit, snap fit and/or welding; and/or the casing and the second tubular body are fixed to each other by interference fit, snap fit and/or welding.

10. The connector assembly according to claim 1, wherein the first tubular body has a plug end defining a port, wherein the valve unit comprises a valve core and an elastic member, the valve core is movable in the first axial direction between a first closed position and a first open position, and the valve core is biased toward the first closed position by the elastic member, wherein the valve core blocks the port to cut off a flow path of the female connector when the valve core is in the first closed position, and the flow path of the female connector is opened when the valve core is in the first open position.

11. The connector assembly according to claim 10, wherein the plug end defines a first inner peripheral inclined surface and a second inner peripheral inclined surface, wherein an inner peripheral surface of the port, the first inner peripheral inclined surface and the second inner peripheral inclined surface are sequentially connected in the first axial direction, and the first inner peripheral inclined surface and the second inner peripheral inclined surface are configured to guide a sealing member embedded in an outer periphery of the valve core to move in the first axial direction to come into sealing contact with the inner peripheral surface of the port, wherein the first inner peripheral inclined surface and the second inner peripheral inclined surface respectively form a first angle and a second angle with respect to the first axial direction, and the first angle is smaller than the second angle.

12. The connector assembly according to claim 11, wherein the first angle ranges from 5° to 15°.

13. The connector assembly according to claim 1, wherein the valve assembly comprises a valve stem, a sliding sleeve and an elastic element, the valve stem comprises a valve stem head portion and a valve stem base portion at two ends of the valve stem respectively, the sliding sleeve is arranged in the second tubular body and sleeved outside the valve stem and is slidable between a second closed position and a second open position along the second axial direction, and two ends of the elastic element respectively abut against the sliding sleeve and the valve stem base portion to bias the sliding sleeve toward the second closed position, and wherein the sliding sleeve blocks an annular gap between the second tubular body and the valve stem head portion to cut off a flow path of the male connector when the sliding sleeve is in the second closed position, and the flow path of the male connector is opened when the sliding sleeve is in the second open position.

14. The connector assembly according to claim 13, wherein the valve stem base portion comprises:

a base body provided with a through hole penetrating through the base body for fluid to flow therethrough; and a projection extending from a center of the base body and extending away from the valve stem head portion, the projection tapering in a direction away from the valve stem head portion.

15. The connector assembly according to claim 14, wherein the projection is in a shape of semi-ellipsoid.

16. The connector assembly according to claim 1, wherein the second tubular body comprises a second tubular main body, the locking protrusion is made of metal and the second tubular main body is made of plastic, and wherein the second tubular main body and the locking protrusion are integrally formed by insert injection molding.

* * * * *